(12) United States Patent
Watariuchi

(10) Patent No.: US 11,533,406 B2
(45) Date of Patent: Dec. 20, 2022

(54) INFORMATION PROCESSING SYSTEM, METHOD FOR CONTROLLING THE SAME, AND STORAGE MEDIUM FOR DISPLAYING OBJECTS USED FOR EXECUTING PROCESSING AND DISPLAYING A SETTING SCREEN

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/020,495

(22) Filed: Sep. 14, 2020

(65) Prior Publication Data

US 2021/0092245 A1 Mar. 25, 2021

(30) Foreign Application Priority Data

Sep. 20, 2019 (JP) .............................. JP2019-171678
Jun. 17, 2020 (JP) .............................. JP2020-104632

(51) Int. Cl.
*H04N 1/00* (2006.01)
*H04N 1/44* (2006.01)

(52) U.S. Cl.
CPC ..... *H04N 1/00474* (2013.01); *H04N 1/00411* (2013.01); *H04N 1/00413* (2013.01); *H04N 1/00509* (2013.01); *H04N 1/4433* (2013.01)

(58) Field of Classification Search
None
See application file for complete search history.

(56) References Cited

U.S. PATENT DOCUMENTS 8,117,349 B2 * 2/2012 Murata .............. H04N 1/00482
710/8
10,866,795 B2 * 12/2020 Sakai ..................... G06F 9/4451
10,904,402 B2 * 1/2021 Shibukawa ........ H04N 1/00466

FOREIGN PATENT DOCUMENTS

JP 5599085 B2 10/2014

* cited by examiner

*Primary Examiner* — Paul F Payer
(74) *Attorney, Agent, or Firm* — Canon U.S.A., Inc. IP Division

(57) ABSTRACT

Embodiments of the present disclosure provide a device comprising a memory and a processor in communication with the memory. The processor is configured to perform displaying a display object associated with processing and including at least a first area and a second area, and detecting an operation of a user on the display object. In a case where the detected operation is an operation on the first area of the display object, the processing associated with the display object is executed. In a case where the detected operation is an operation on the second area of the display object, a setting screen for the processing associated with the display object is displayed.

18 Claims, 21 Drawing Sheets

FIG.5

| | Button ID 501 | Button Name 502 | CALLING TARGET APP 503 | SETTING VALUE 504 |
|---|---|---|---|---|
| 511 | b001 | BLACK-WHITE ONE-SIDED COPY | COPY APP 404 | 1copy, bw, one-sided |
| 512 | b002 | TRANSMIT TO FOLDER A | TRANSMISSION APP 406 | color, two-sided, 300dpi, to:\\server1\folderA\ |
| 513 | b003 | PRINT | PRINT APP 405 | allprint |
| 514 | b004 | COPY | COPY APP 404 | ... |
| 515 | b005 | FAX | FAX APP 407 | ... |
| 516 | b006 | SCAN AND TRANSMIT | TRANSMISSION APP 406 | ... |
| | ... | ... | ... | ... |

FIG. 11

| | Button ID 501 | Button Name 502 | CALLING TARGET APP 503 | SETTING VALUE 504 | DISPLAY FORM 1101 |
|---|---|---|---|---|---|
| 1111 | b001 | BLACK-WHITE ONE-SIDED COPY | COPY APP 404 | 1copy, bw, one-sided | Type B |
| 1112 | b002 | TRANSMIT TO FOLDER A | TRANSMISSION APP 406 | color, two-sided, 300dpi, to:\\server1\folderA\ | Type C |
| 1113 | b003 | PRINT | PRINT APP 405 | allprint | Type A |
| 1114 | b004 | COPY | COPY APP 404 | --- | --- |
| 1115 | b005 | FAX | FAX APP 407 | --- | --- |
| 1116 | b006 | SCAN AND TRANSMIT | TRANSMISSION APP 406 | --- | --- |
| | ... | ... | ... | ... | ... |

FIG.16

| USER ID | SETTING CALLING OPERATION | EXECUTION CALLING OPERATION |
|---|---|---|
| u001 | TAP | TWO-FINGER TAP |
| u002 | TAP | LONG PRESS |
| u003 | TAP | DOUBLE TAP |
| u004 | TAP | PINCH-OUT |
| u005 | AREA DIVISION (Type A) | AREA DIVISION (Type A) |
| u006 | TWO-FINGER TAP | TAP |
| ... | ... | ... |

INFORMATION PROCESSING SYSTEM, METHOD FOR CONTROLLING THE SAME, AND STORAGE MEDIUM FOR DISPLAYING OBJECTS USED FOR EXECUTING PROCESSING AND DISPLAYING A SETTING SCREEN

BACKGROUND

Field of the Disclosure

The present disclosure relates to a technique for cooperation between a plurality of information processing apparatuses.

Description of the Related Art

In recent years, an image processing apparatus (e.g., a multifunction peripheral (MFP)) installed in an office generally includes a menu screen. The menu screen is a screen for allowing a user to select which application (hereinafter referred to as "app") is to be called from among a plurality of apps installed in the MFP. On the menu screen, an app is called by pressing a button.

Japanese Patent No. 5599085 discusses a technique for displaying on a menu screen a button for calling an app by giving a particular setting value to the app. If the button is pressed, a setting screen for the app on which the setting value is reflected is displayed, or the processing of the app on which the setting value is reflected is executed.

In a conventional technique, however, only a single operation can be assigned to a single button. Thus, to allow a user to select either of two operations such as the operation of executing the processing of an app based on a predetermined setting value by pressing a button, and the operation of opening a setting screen for the app by pressing a button, it is necessary to display two buttons associated with the respective operations on a menu screen. That is, in an apparatus in which a plurality of types of apps can each perform a plurality of types of operations, to allow a user to select which of the apps to perform which of the operations, many buttons are displayed on a menu screen. This makes it troublesome for the user to search for a desired button.

SUMMARY

A device according to at least one of the embodiments by the present disclosure comprises a memory and a processor in communication with the memory, wherein the processor is configured to perform displaying a display object associated with processing and including at least a first area and a second area, detecting an operation of a user on the display object, in a case where the detected operation is an operation on the first area of the display object, executing the processing associated with the display object, and in a case where the detected operation is an operation on the second area of the display object, displaying a setting screen for the processing associated with the display object.

Further features of the present disclosure will become apparent from the following description of exemplary embodiments with reference to the attached drawings.

BRIEF DESCRIPTION OF THE DRAWINGS

FIG. 5 is an example of a button management table according to the first exemplary embodiment of the present disclosure.

FIG. 11 is an example of a button management table according to the second exemplary embodiment of the present disclosure.

FIG. 16 is an example of a user management table according to the fourth exemplary embodiment of the present disclosure.

DESCRIPTION OF THE EMBODIMENTS

With reference to the drawings, the best mode for carrying out the present exemplary embodiments will be described below. The following exemplary embodiments do not limit the present disclosure in the scope of the appended claims, and not all the combinations of the features described in the exemplary embodiments are essential for a method for solving the issues according to the present disclosure.

First Exemplary Embodiment

Figure 1:
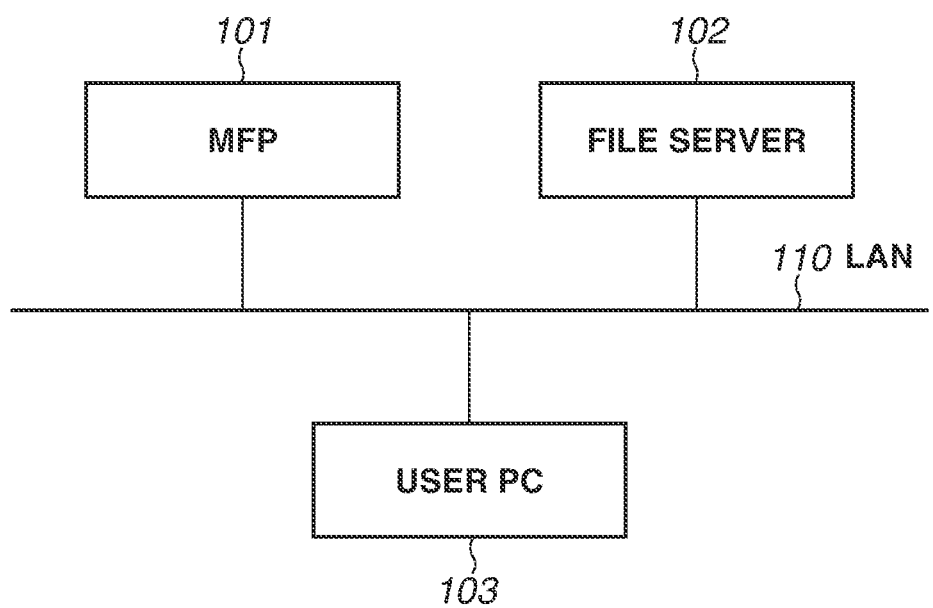
FIG. 1 is a diagram illustrating a configuration of an information processing system according to a first exemplary embodiment of the present disclosure.

FIG. 1 is a diagram illustrating an example of a system configuration of an information processing system according to the present exemplary embodiment. This system includes a multifunction peripheral (MFP) 101, a file server 102, and a user personal computer (PC) 103 that are connected together via a local area network (LAN) 110. The apparatuses on the LAN 110 can communicate with each other through the networks of the respective apparatuses. FIG. 1 is an example of a typical network configuration, and the apparatuses may be on either the LAN 110 or a wide area network (WAN) (not illustrated). Alternatively, the number of apparatuses may increase or decrease.

The MFP 101 is an example of an image processing apparatus including a scanner and a printer. The file server 102 is a server including a network folder accessible by the MFP 101 and the user PC 103. For example, the MFP 101 transmits scanned image data to the file server 102, and the file server 102 saves the image data in the folder. The user PC 103 is a PC used by a user to perform work. According to an operation of the user, the user PC 103 can transmit print data to the MFP 101 using a printer driver.

Figure 2:
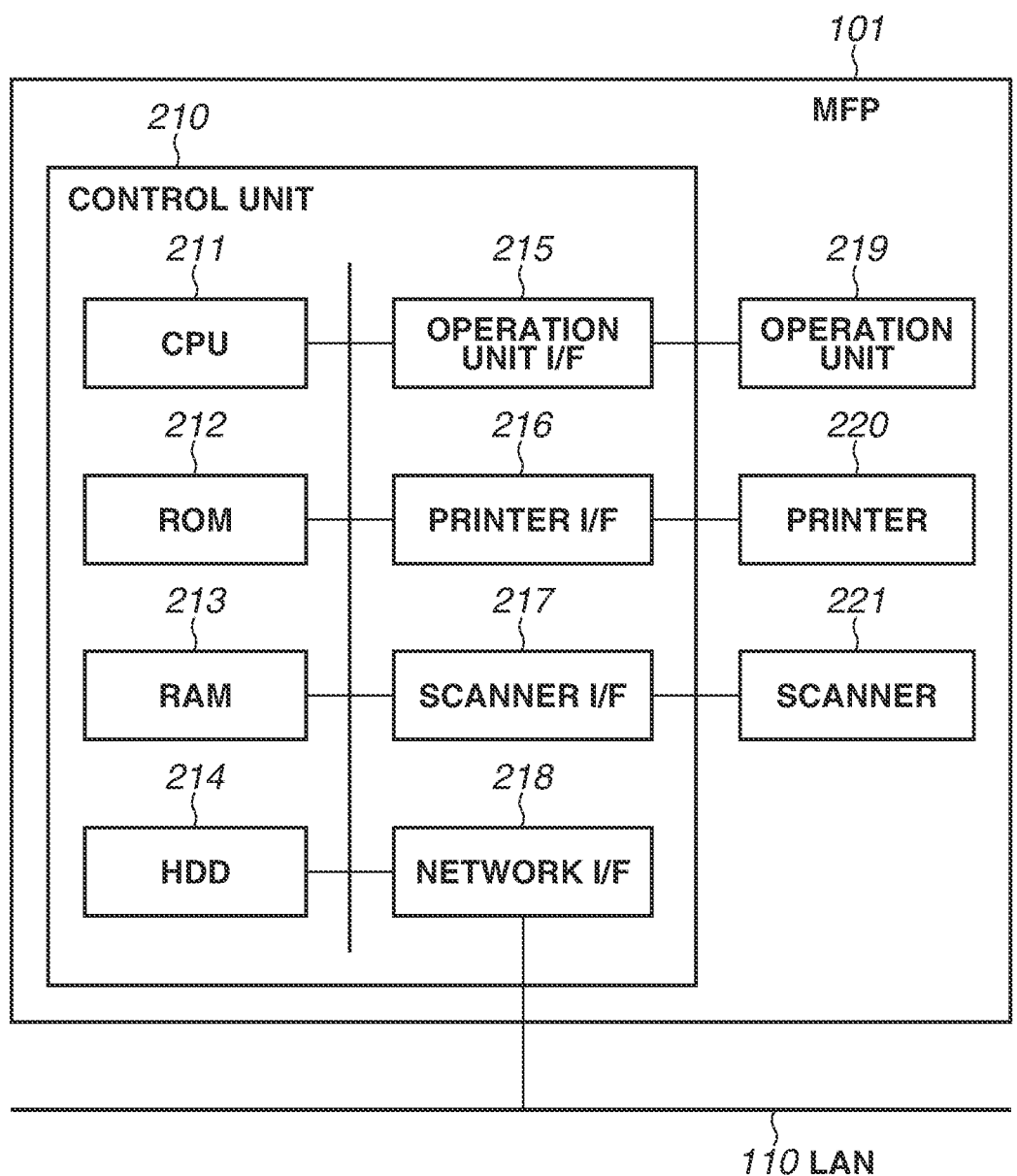
FIG. 2 is a block diagram illustrating a hardware configuration of a multifunction peripheral (MFP) according to the first exemplary embodiment of the present disclosure.

FIG. 2 is a block diagram illustrating a hardware configuration of the MFP 101. A control unit 210 including a central processing unit (CPU) 211 controls the operation of the entirety of the MFP 101. The CPU 211 reads a control program stored in a read-only memory (ROM) 212 or a hard disk drive (HDD) 214 and executes various control processes such as reading control and transmission control. A random-access memory (RAM) 213 is used as a temporary storage area such as a main memory or a work area for the CPU 211. The HDD 214 stores image data and various programs.

An operation unit interface (I/F) 215 connects an operation unit 219 and the control unit 210. The operation unit 219 includes a liquid crystal display unit having a touch panel function, and a keyboard. A printer I/F 216 connects a printer 220 and the control unit 210. Image data to be printed by the printer 220 is transferred from the control unit 210 to the printer 220 via the printer I/F 216 and printed on a recording medium by the printer 220. A scanner I/F 217 connects a scanner 221 and the control unit 210. The scanner 221 reads an image on a document and generate image data. Then, the scanner 221 inputs the generated image data to the control unit 210 via the scanner I/F 217. A network I/F 218 connects the control unit 210 (the MFP 101) to the LAN 110. The network I/F 218 transmits and receives various pieces of information to and from another apparatus on the LAN 110.

Figure 3:
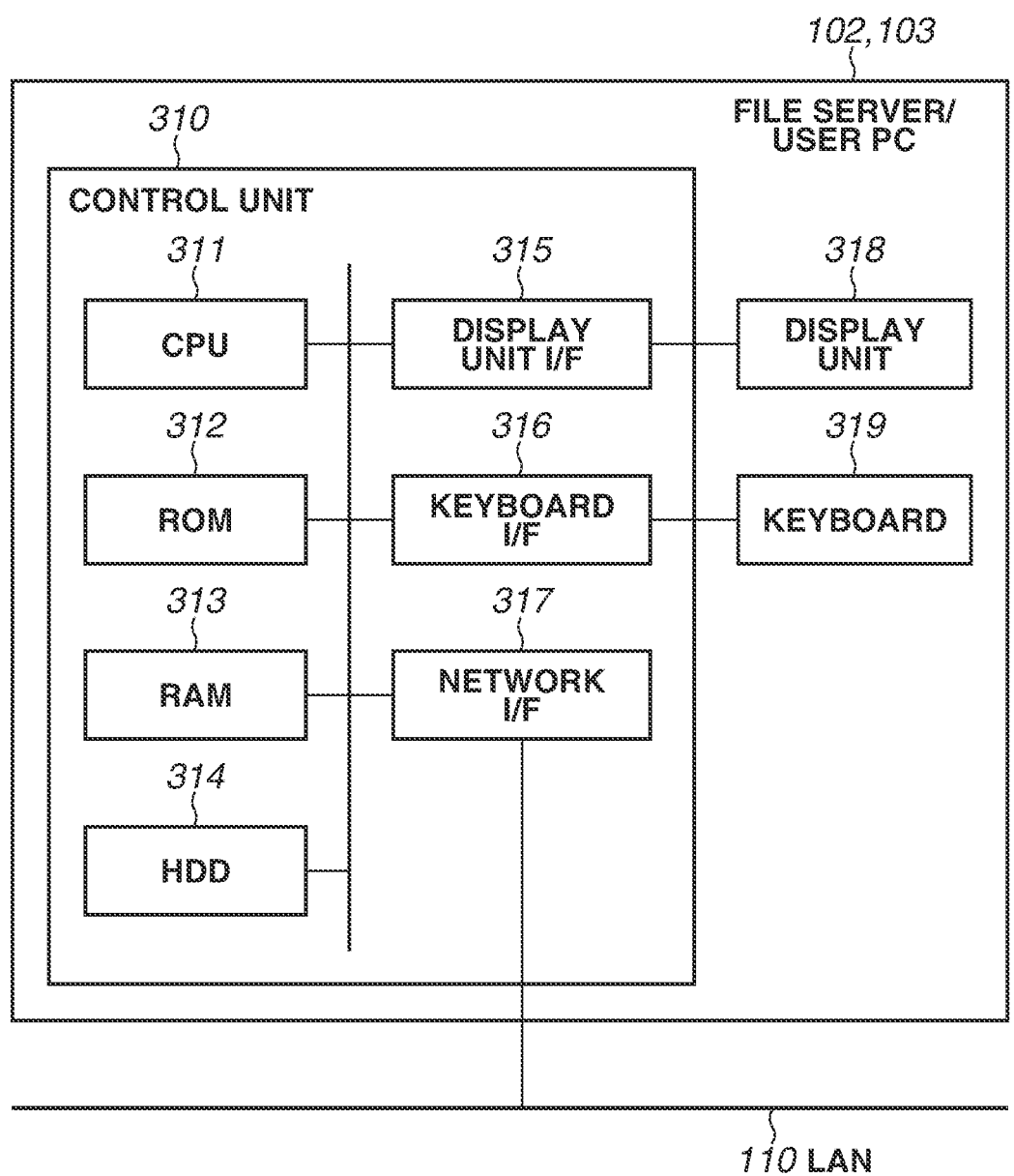
FIG. 3 is a block diagram illustrating a hardware configuration of each of a file server and a user personal computer (PC) according to the first exemplary embodiment of the present disclosure.

FIG. 3 is a block diagram illustrating a hardware configuration of each of the file server 102 and the user PC 103. A control unit 310 including a CPU 311 controls the operation of the entirety of the apparatus. The CPU 311 reads a control program stored in a ROM 312 or an HDD 314 and executes various control processes. A RAM 313 is used as a temporary storage area such as a main memory or a work area for the CPU 311. The HDD 314 stores various programs and data. A display unit I/F 315 connects a display unit 318 and the control unit 310. A keyboard I/F 316 connects a keyboard 319 and the control unit 310. The CPU 311 recognizes an instruction from the user through the keyboard 319 and displays a screen according to the recognized instruction on the display unit 318. A network I/F 317 connects the control unit 310 to the LAN 110. The network I/F 317 transmits and receives various pieces of information to and from another apparatus on the LAN 110.

Figure 4:
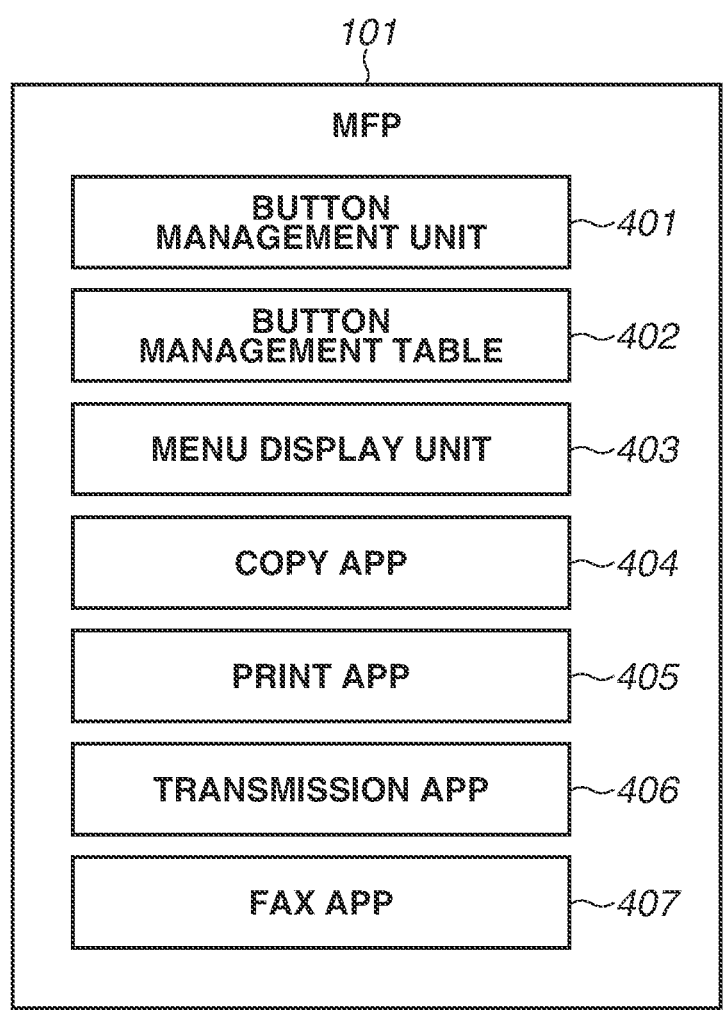
FIG. 4 is a block diagram illustrating a software configuration of the MFP according to the first exemplary embodiment of the present disclosure.

FIG. 4 is a diagram illustrating a software configuration of the MFP 101 according to the present exemplary embodiment. Processing described below is achieved by the CPU 211 loading a program stored in the HDD 214 or the ROM 212 of the MFP 101 into the RAM 213 and executing the program.

A button management unit 401 manages a button to be displayed on a menu screen of the MFP 101. A button management table 402 is a table holding information regarding a button to be displayed on the menu screen of the MFP 101 and is recorded in the RAM 213 or the HDD 214. A menu display unit 403 displays the menu screen on the operation unit 219. The menu display unit 403 displays a button held in the button management table 402 on the menu screen. A copy app 404 is an application that provides a copy function. A print app 405 is an application that provides the function of printing a print job accumulated in the MFP 101 (hereinafter, "reservation printing"). The print app 405 once saves, in the HDD 214, print data received from an external apparatus such as the user PC 103 and prints the print data upon receipt of an instruction from the user. A transmission app 406 is an application that provides the function of transmitting scanned image data to a destination specified by the user. A network folder of the file server 102 can be specified as a transmission destination. A fax app 407 is an application that provides a fax function. The applications 404 to 407 are merely examples, and the MFP 101 may include other applications.

FIG. 5 illustrates an example of the button management table 402 according to the present exemplary embodiment. A single row corresponds to button information regarding a single button. The button management table 402 in FIG. 5 defines six buttons in rows 511 to 516 as examples.

The button management table 402 has four columns, i.e., columns 501 to 504. The "button ID" column 501 is a column defining an identifier for uniquely identifying a button. The "button name" column 502 is a column defining the name of a button. The "calling target app" column 503 is a column defining an application (an app) to be called when a button is selected by the user. The "setting value" column 504 is a column defining a setting value to be given as a parameter to an app when the app is called. The "setting value" is a value indicating a setting regarding the function of the app. The "parameter" is a variable to be given to the app when the app is called, and includes information indicating a setting value or a flag. A button for which a value is set in the "setting value" column 504 (e.g., the row 511) is a button that enables an app to be called or processing to be executed in the state where a setting value associated with the button is reflected. Hereinafter, a button thus associated with a setting value will be referred to as a "custom button". On the other hand, a button for which a value is not set in the "setting value" column 504 (e.g., the row 514) is a button for calling an app without giving a setting value to the app (hereinafter, an "app button").

Figure 6:
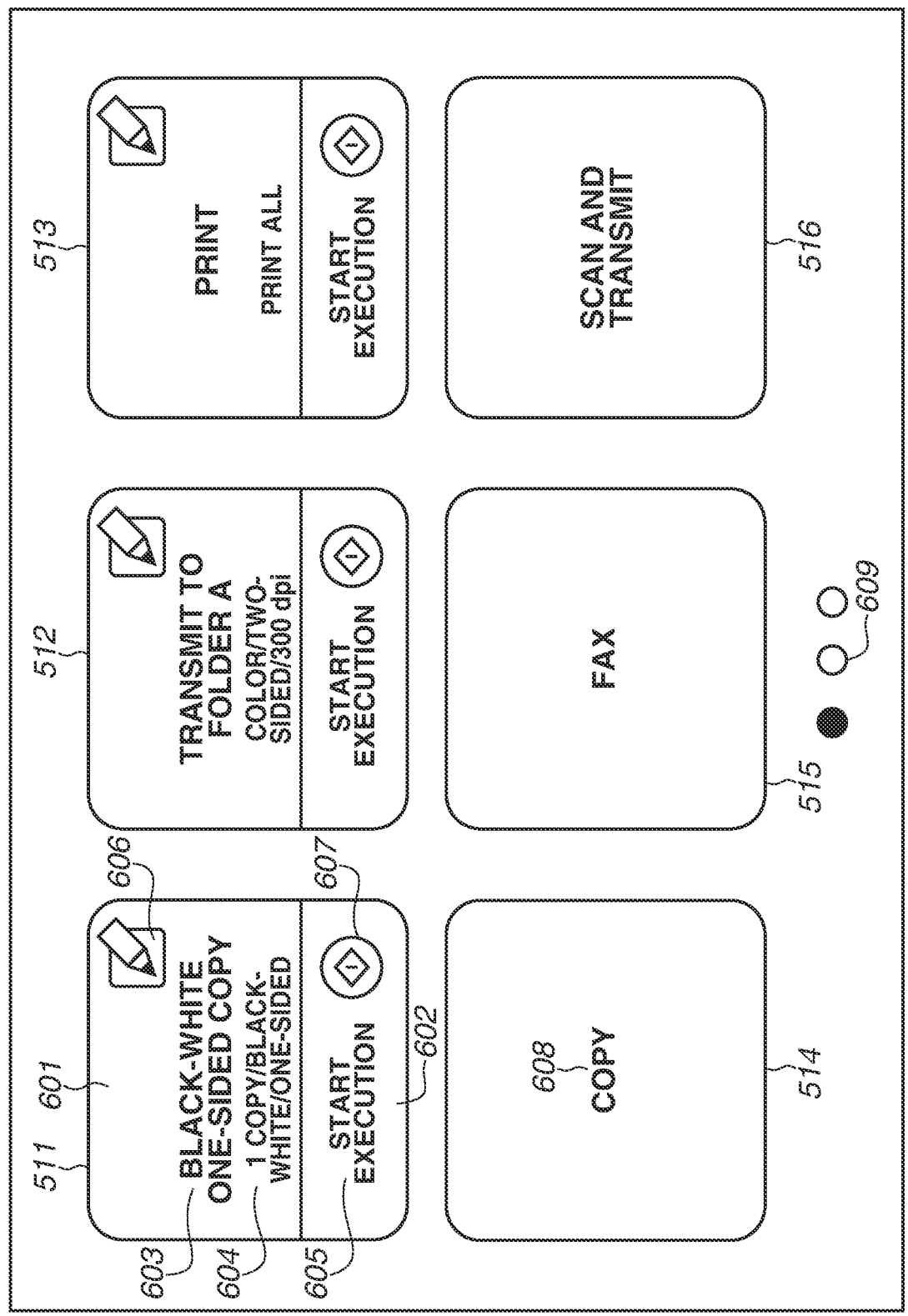
FIG. 6 is an example of a menu screen according to the first exemplary embodiment of the present disclosure.

FIG. 6 illustrates an example of the menu screen of the MFP 101 according to the present exemplary embodiment. In FIG. 6, the six buttons, i.e., the buttons 511 to 516, defined in the button management table 402 are displayed. As defined in the button management table 402, the buttons 511, 512, and 513 are custom buttons, and the buttons 514, 515, and 516 are app buttons.

The display of a custom button will be described using the button 511 as an example. The inside of the custom button includes two areas, i.e., areas 601 and 602. Operations are different between a case where the user presses the area 601 and a case where the user presses the area 602. If the user presses the area 601, a setting screen for an app defined in the "calling target app" column 503 is called in the state where a setting value defined in the "setting value" column 504 is reflected. If, on the other hand, the user presses the area 602, a job of the app defined in the "calling target app" column 503 is executed based on the setting value defined in the "setting value" column 504. That is, if the area 602 is pressed, processing is immediately executed without opening a confirmation screen or a setting screen.

A label 603 displays a button name defined in the "button name" column 502. A label 604 displays a setting value obtained by converting the setting value defined in the "setting value" column 504 into a character string based on a certain rule. For example, only a setting value important for the app is displayed, or only the difference from a standard setting value is displayed. In this case, setting values "a copy", "black-white", and "one-sided" for copying are indicated. A label 605 displays a character string indicating to the user that if the area 602 is pressed, the job of the app will be executed. An icon 606 displays an image for indicating to the user that if the area 601 is pressed, the setting screen for the app will be called. An icon 607 displays an image for indicating to the user that that if the area 602 is pressed, the job of the app will be executed. The button 511 is merely an example of the display of a custom button, and another type of display may be performed. For example, an area in the button may be divided into left and right areas, or only a part of the button may be set as an area for the execution.

The display of an app button will be described using the button 514 as an example. The app button includes a single area. If the user presses the button, an app defined in the "calling target app" column 503 is called. A label 608 displays a button name defined in the "button name" column 502.

A page display area 609 indicates the total number of pages of the menu screen and the currently displayed page. In the example of FIG. 6, the page display area 609 indicates that the menu screen has three pages, and the first page is currently displayed. It is possible to cause the menu screen to transition by a flick operation.

In the present exemplary embodiment, buttons are used to call applications. Alternatively, applications may be displayed in another form, for example, using a list.

Figure 21:
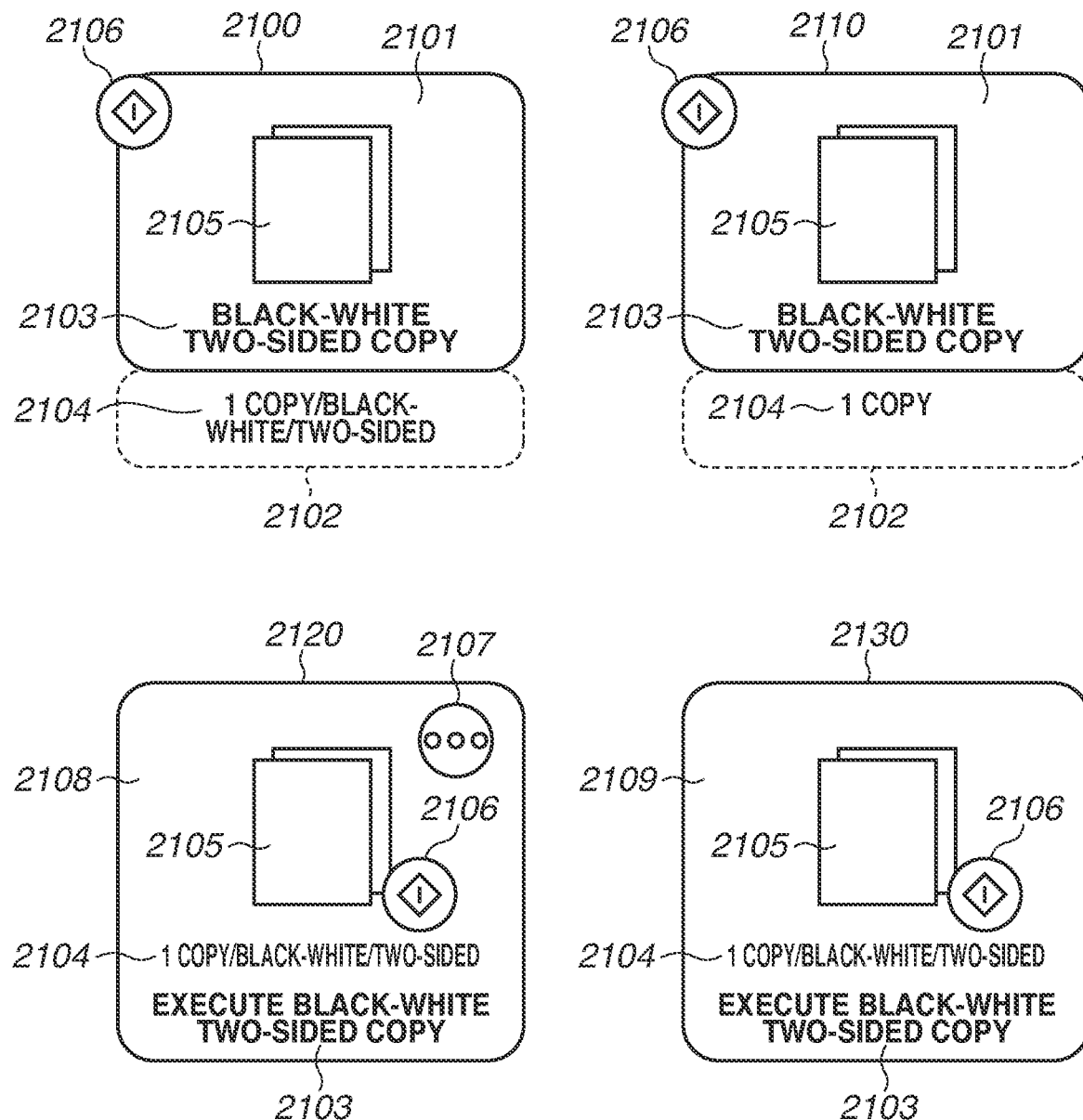
FIG. 21 is examples of a button displayed on the menu screen according to the first exemplary embodiment of the present disclosure.

The display form of a custom button is not limited to the above form. With reference to FIG. 21, other examples of the display form of a custom button are illustrated. Buttons 2100, 2110, 2120, and 2130 in FIG. 21 all illustrate the button 511. The same numbers are assigned to the same functions and properties. The buttons 2100 and 2110 include two areas, i.e., areas 2101 and 2102. If the user presses the area 2101, the job is executed based on the defined setting value. If the user presses the area 2102, the setting screen is opened in the state where the defined setting value is reflected. As illustrated in FIG. 21, the display forms of the areas 2101 and 2102 may be different from each other. A label 2103 displays the button name. A label 2104 displays a setting value obtained by converting the setting value defined in the "setting value" column 504 into a character string based on a certain rule. The label 2104 in the button 2100 indicates "a copy/black-white/two-sided", and the label 2104 in the button 2110 indicates "a copy". If the user presses the area 2102 in the button 2100, a setting screen that enables the user to change the settings of "a copy/black-white/two-sided", i.e., the number of copies, the color setting, and the one-sided/two-sided settings, may be opened. If the user presses the area 2102 in the button 2110, a setting screen that enables the user to change only the setting of "a copy", i.e., the number of copies, may be opened.

An icon 2105 displays an image indicating processing corresponding to the button. An icon 2106 displays an image indicating to the user that if the area 2101 is pressed, the job of the app will be executed.

In the button 2120, if the user presses an icon 2107, the setting screen on which the setting value is reflected is opened. If the user presses an area 2108 other than the icon 2107, the processing is executed based on the defined setting value. The icon 2106 indicates that if the area 2108 is pressed, the processing will be immediately executed. For a user who changes a setting by opening the setting screen less frequently, it is more convenient if the area 2108 for immediately executing the processing is large. The icon 2107 displays an image indicating to the user that if the icon 2107 is pressed, the setting screen will be opened.

In the button 2130, if the user presses the icon 2106, the processing is executed based on the defined setting value. If the user presses an area 2109 other than the icon 2106, the setting screen on which the setting value is reflected is opened. The processing is not executed until a narrow area such as the icon 2106 is pressed. Thus, it is possible to prevent the processing from being executed by an erroneous operation.

The icon 2106 or 2107 may be hidden until the button is initially executed. For example, when the user presses the button for the first time, it may be indicated to the user that the processing will be immediately executed by pressing the button, and the icon 2106 or 2107 may be displayed for the first time in the button. Then, from the next time onward, if a particular area in the button is pressed, the processing is immediately executed. Alternatively, the display forms of these custom buttons may adapt to an app button.

Figure 20:
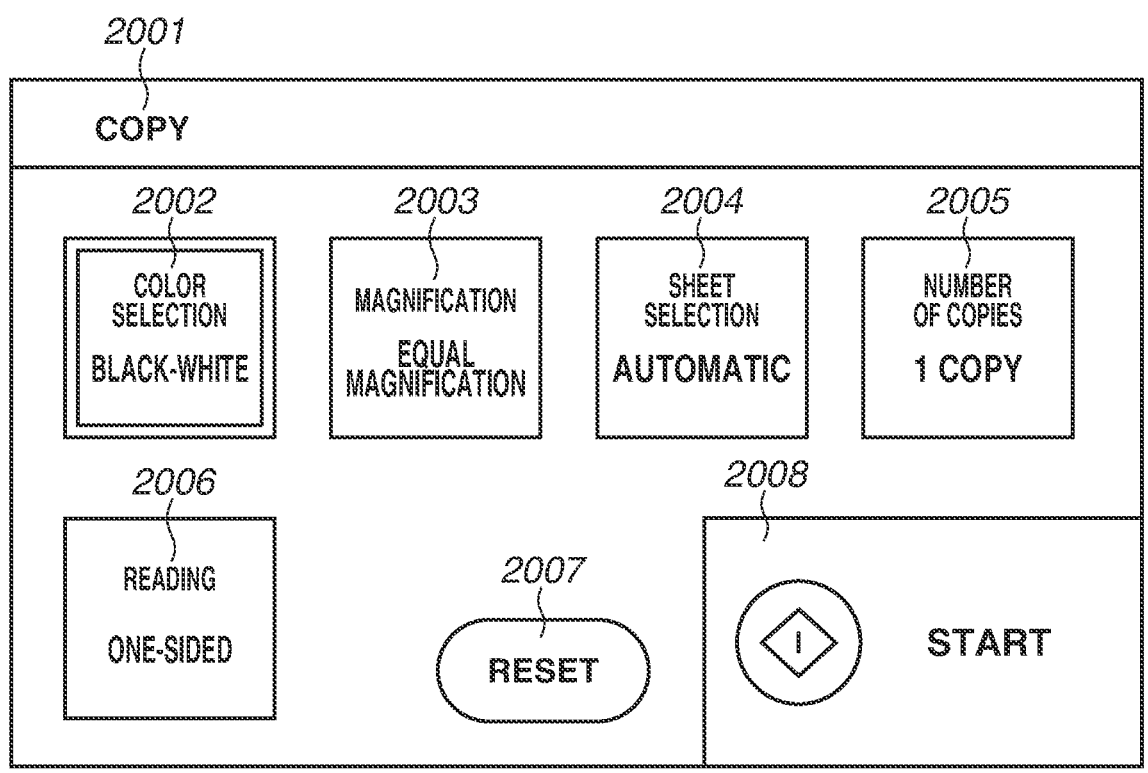
FIG. 20 is an example of a setting screen for an application according to the first exemplary embodiment of the present disclosure.

FIG. 20 is an example of the setting screen for the app called when the user presses the area 601 in the button 511 on the menu screen. The calling target app 503 of the button 511 is defined as "copy app 404", and therefore, the called app is the copy app 404. FIG. 20 illustrates the state where setting values defined in the "setting value" column 504 of the button 511 are reflected.

A label 2001 displays the name of the called application. Areas 2002 to 2006 display the current setting values of the copy app 404. The setting values defined in the "setting value" column 504 of the button 511 are "a copy", "black-white", and "one-sided". Thus, the area 2005 displays "a copy", the area 2002 displays "black-white", and the area 2006 displays "one-sided". As setting values that are not defined in the "setting value" column 504 (areas 2003 and 2004), the default values are displayed.

In each of the areas 2002 to 2006, if the setting value is changed from the default value, a frame indicating the area is represented as a double-line frame. In FIG. 20, the setting value of the area 2002 (the default value of the color selection is "color") is different from the default value, and the area 2002 is thus represented with a double-line frame. In the "setting value" column 504 of the button 511, "a copy" is set and is the same as the default value of the number of copies, which is "a copy". Thus, the area 2005 is represented with a single-line frame.

In each of the areas 2002 to 2006, if the area is pressed, a dialog for changing the setting value is displayed, and the user can change the setting value.

A button 2007 is a button for changing the setting values back to the default values. A button 2008 is a button for starting the job based on the currently set setting values.

Figure 7:
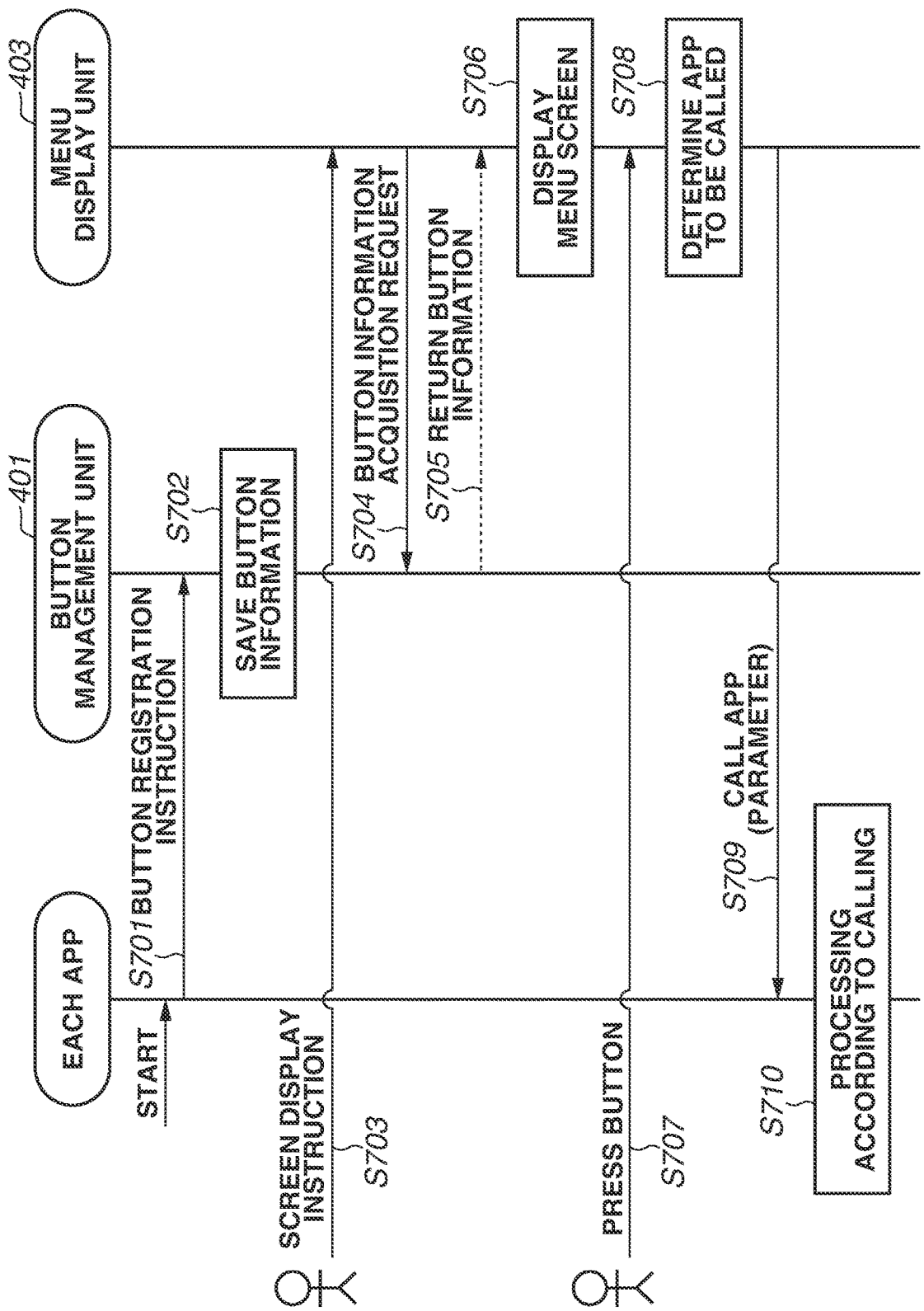
FIG. 7 is a sequence diagram illustrating a flow of a series of processes of the MFP according to the first exemplary embodiment of the present disclosure.

FIG. 7 is a sequence diagram illustrating a flow of a series of processes according to the present exemplary embodiment. FIG. 7 illustrates an example of the flow from the registration of a button to the display of the menu screen (the button) to the calling of an app by the pressing of the button. The processes in the sequence in FIG. 7 and the steps in flowcharts described below are executed by the CPU 211 loading a program stored in the HDD 214 of the MFP 101 into the RAM 213 and analyzing and executing the program.

First, in step S701, when each of the apps (404 to 407) is started, the app gives a registration instruction to register a button to the button management unit 401. In this sequence, the timing of the registration of the button is a time when the app is started. This is, however, merely an example, and another timing may be used. The registration instruction to register the button includes information (a button name, a calling target app, and a setting value) in the columns of the button management table 402.

In step S702, the button management unit 401 having received the registration instruction to register the button saves the received button information in the button management table 402.

In step S703, the menu display unit 403 receives from the user a display instruction to display the menu screen. In step S704, the menu display unit 403 makes an acquisition request to acquire the button information to the button management unit 401. In step S705, the button management unit 401 returns the button information to the menu display unit 403 as a response to the request made in step S704. In step S706, based on the button information received in step S705, the menu display unit 403 displays the menu screen on the operation unit 219.

In step S707, the menu display unit 403 receives an operation (the pressing of a button) performed by the user. In step S708, based on the operation of the user received in step S707, the menu display unit 403 determines an app to be called and a parameter to be given to the app when the app is called. In step S709, the menu display unit 403 calls the app based on the determination in step S708. In step S710, the called app performs processing based on the parameter given to the app when the app is called.

Figure 8:
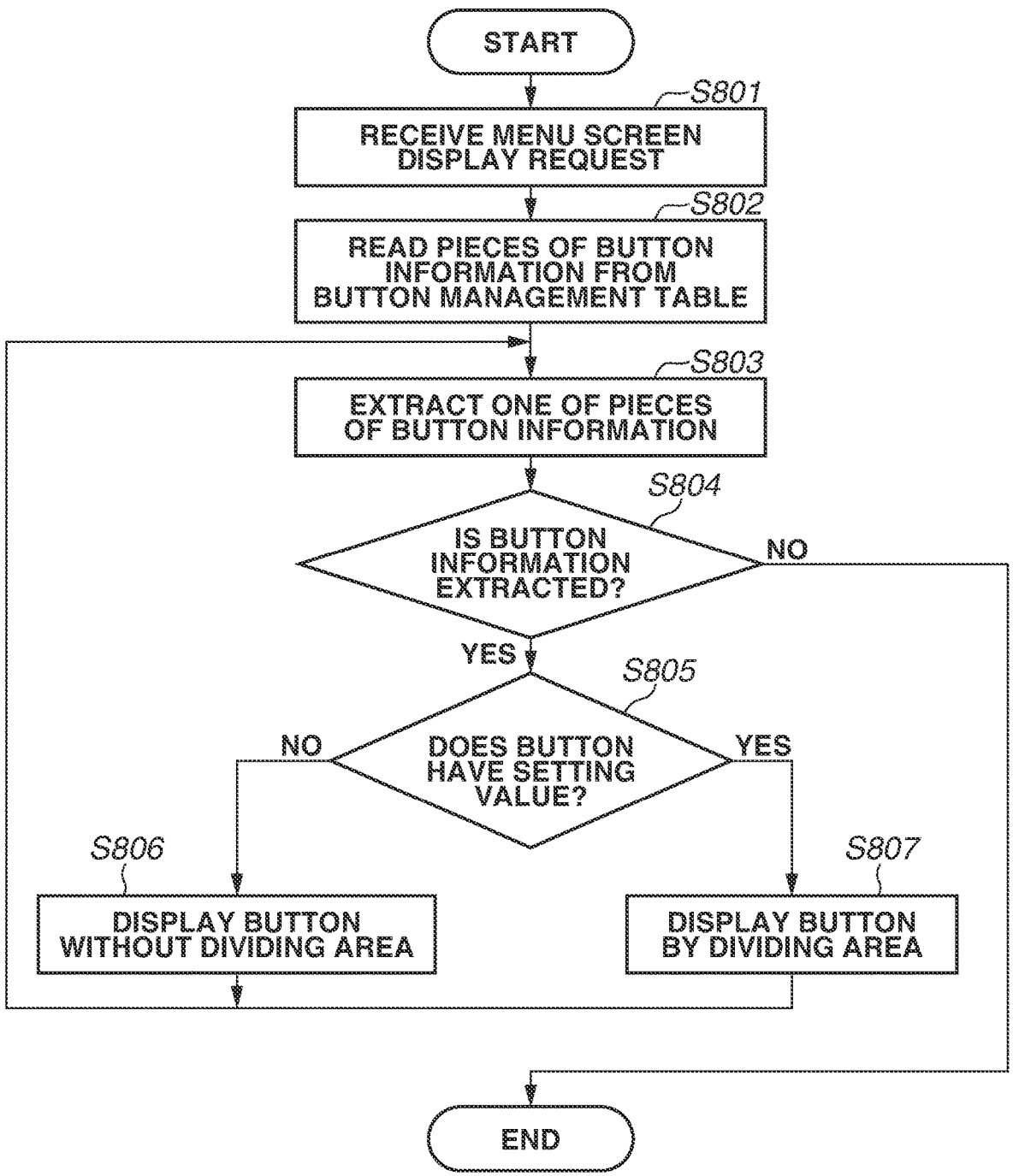
FIG. 8 is a flowchart illustrating processing of the MFP according to the first exemplary embodiment of the present disclosure.

FIG. 8 is a flowchart illustrating the processing of the MFP 101 according to the present exemplary embodiment. A description is given of the processing from the reception of a display request to display the menu screen from the user to the display of the menu screen on the operation unit 219. The flowchart in FIG. 8 corresponds to the processes of steps S703 to S706 in the sequence diagram in FIG. 7.

In step S801, the menu display unit 403 receives a display request to display the menu screen. The display request to display the menu screen is the operation of the user causing a screen to transition to the menu screen or is a notification from the system (e.g., if an operation of the user is not performed for a certain time period, the menu screen is displayed). In step S802, the menu display unit 403 reads pieces of button information regarding buttons to be displayed on the menu screen from the button management table 402 via the button management unit 401. In the present exemplary embodiment, the buttons to be displayed are common to all users, the menu display unit 403 thus reads all pieces of button information held in the button management table 402. Alternatively, different buttons may be displayed for respective users, or validity periods may be set for buttons. In this case, a column may be added to the button management table 402, and necessary information may be managed with respect to each button. In the following description, the group of pieces of button information acquired in step S802 will be referred to as a "button list".

Steps S803 to S807 are steps for extracting each of the pieces of button information from the button list and processing the piece of button information. In step S803, the menu display unit 403 extracts one of the pieces of button information to be processed in the subsequent steps from the button list. In step S804, the menu display unit 403 determines whether button information is extracted in the previous step. If button information is extracted (YES in step S804), the processing proceeds to step S805. If not (NO in step S804), the processing is ended. In the following description, if button information is described simply as "button information", the button information refers to the button information extracted in step S803.

In step S805, the menu display unit 403 determines whether a setting value is present in the "setting value" column 504 of the button information. If a setting value is present (YES in step S805), the processing proceeds to step S807. If not (NO in step S805), the processing proceeds to step S806. In step S806, the menu display unit 403 displays an app button corresponding to the button information. As illustrated in the buttons 514 to 516 in FIG. 6, each of the app buttons includes a single area (i.e., a button is not divided into a plurality of areas), and the button name 502 is displayed at the center of the button. To identify which button is pressed by the user, the button is associated with the button ID 501 as data of the button. After step S806, the processing returns to step S803.

In step S807, the menu display unit 403 displays a custom button corresponding to the button information. As illustrated in the buttons 511 to 513 in FIG. 6, each of the custom buttons includes a plurality of areas (i.e., a single button divided into a plurality of areas), and information regarding the button name 502 and the setting value 504 is displayed in the button. To identify which button is pressed by the user, the button is associated with the button ID 501 as data of the button. After step S807, the processing returns to step S803.

Figure 9:
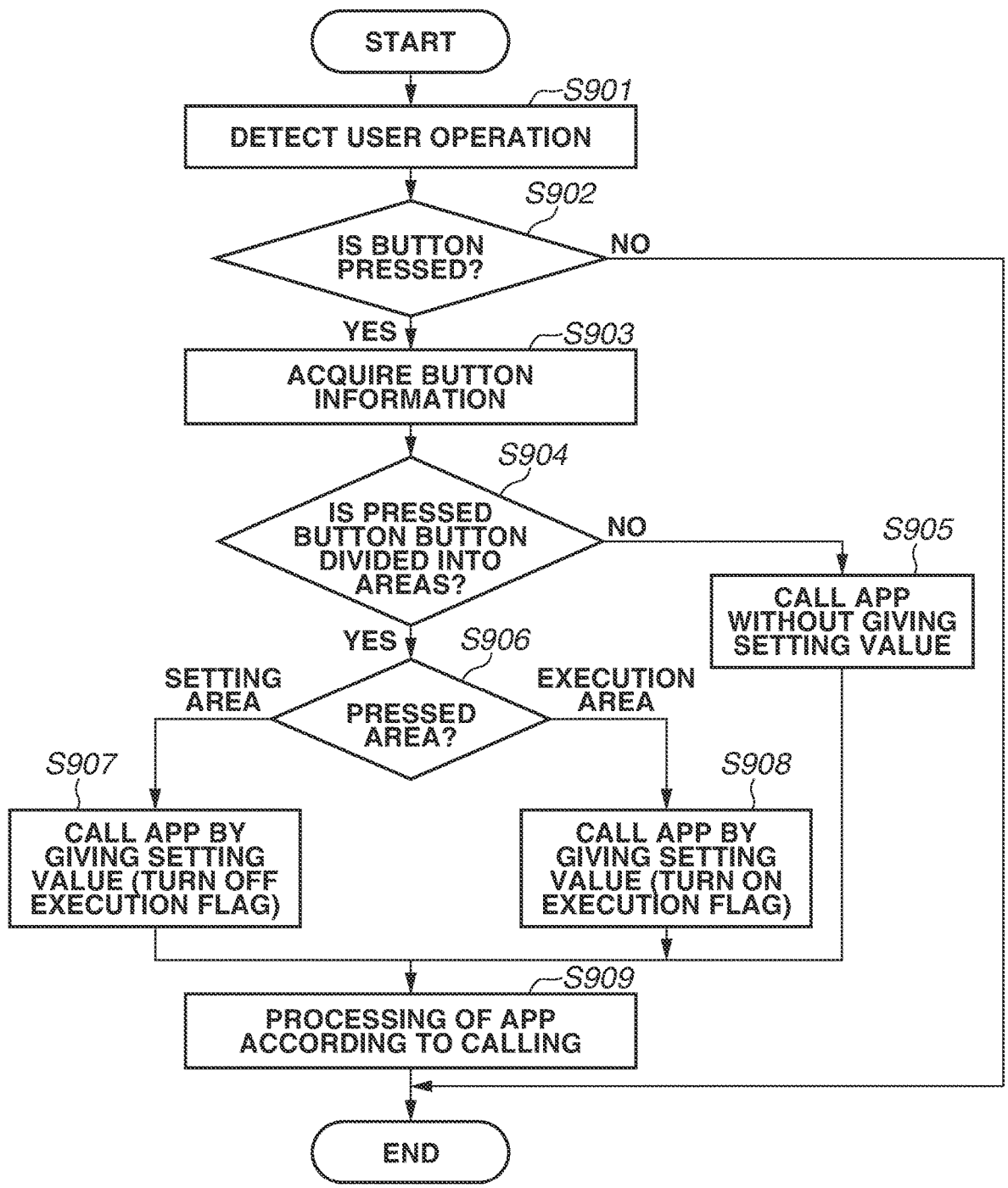
FIG. 9 is a flowchart illustrating processing of the MFP according to the first exemplary embodiment of the present disclosure.

FIG. 9 is a flowchart illustrating processing of the MFP 101 according to the present exemplary embodiment. A description is given of the process of detecting an operation of the user on the menu screen displayed in the flowchart in FIG. 8 and calling an app according to the user operation. The flowchart in FIG. 9 corresponds to the processes of steps S707 to S710 in the sequence diagram in FIG. 7.

In step S901, the menu display unit 403 detects an operation of the user on the menu screen. In step S902, the menu display unit 403 determines whether the user operation detected in the previous step corresponds to the pressing of a button. If the menu display unit 403 determines that the user operation corresponds to the pressing of a button (YES in step S902), the processing proceeds to step S903. If not (NO in step S902), the processing is ended. In the following description, the button pressed by the user in step S901 will be referred to as the "pressed button". In step S903, based on the button ID 501 associated with the pressed button, the menu display unit 403 uniquely identifies the button and acquires button information from the button management table 402. In the following description, if button information is described simply as "button information", the button information refers to the button information acquired in step S903.

In step S904, the menu display unit 403 determines whether the pressed button is a button divided into areas (i.e., a custom button). The determination of whether the pressed button is a button divided into areas is made based on whether a value is defined in the "setting value" column 504 of the button information. If the pressed button is a button divided into areas (YES in step S904), the processing proceeds to step S906. If not (NO in step S904), the processing proceeds to step S905.

In step S905, the menu display unit 403 calls an app corresponding to the pressed button without giving a setting value to the app. The app to be called is an app defined in the "calling target app" column 503 of the button information. Then, the processing proceeds to step S909. The process of step S909 will be described below.

In step S906, the menu display unit 403 determines which area in the button is pressed by the user in step S901. An example of the determination is described with reference to the button 511 in FIG. 6. If the area pressed by the user is a "setting area" (i.e., the area 601), the processing proceeds to step S907. If the area pressed by the user is an "execution area" (i.e., the area 602), the processing proceeds to step S908.

In step S907, the menu display unit 403 calls an app corresponding to the pressed button by giving a parameter including a setting value to the app. The app to be called is an app defined in the "calling target app" column 503 of the button information. The parameter to be given is a setting value defined in the "setting value" column 504 of the button information and an instruction to display a setting screen without executing a job when the app is called (turn off an execution flag). Then, the processing proceeds to step S909.

In step S908, the menu display unit 403 calls an app corresponding to the pressed button by giving a parameter to the app. The app to be called is an app defined in the "calling target app" column 503 of the button information. The parameter to be given is a setting value defined in the "setting value" column 504 of the button information and an instruction to start executing a job when the app is called (turn on the execution flag). Then, the processing proceeds to step S909.

In step S909, the called app performs processing according to the parameter given to the app when the app is called. For example, if a setting value is not included in the parameter, the app is displayed in the initial state. If a setting value and an instruction to turn off the execution flag are given to the parameter, the app displays a setting screen on which the setting value is reflected. If a setting value and an instruction to turn on the execution flag are given to the parameter, the app starts executing a job based on the given setting value.

Based on the procedure described above in the present exemplary embodiment, depending on an area pressed in a single button, it is possible to perform either of two processes, i.e., the process of calling a setting screen and the process of executing processing. This improves the convenience for the user. Even without increasing the number of buttons to be displayed on the menu screen, it is possible to switch whether to execute the processing of an app or open a setting screen for the app depending on the area pressed in the button by the user.

In the present exemplary embodiment, depending on whether a button has a setting value, it is determined whether to divide an area in the button. The present disclosure, however, is not limited to this. For example, depending on the type of an app to be called by pressing a button, it may be determined whether to divide an area in the button.

Further, even if a button does not have a setting value, an area in the button may be divided into areas, and different processes, such as a process of opening a setting screen in the initial state of an app and a process of executing the processing of the app based on a setting in the initial state, may be assigned to the respective areas.

Second Exemplary Embodiment

In the first exemplary embodiment, a description has been given of an exemplary embodiment where a button having a setting value is divided into two areas. The division of an area into two areas is merely an example, and the area may be divided into three or more areas. Further, areas into which an area is to be divided may be changed with respect to each button. In response, in the present exemplary embodiment, a description will be given of an exemplary embodiment having a configuration in which the number of areas into which an area is divided is changed for each button. The second exemplary embodiment is a variation of the first exemplary embodiment, and therefore, only the differences from the first exemplary embodiment will be described.

Figure 10A:
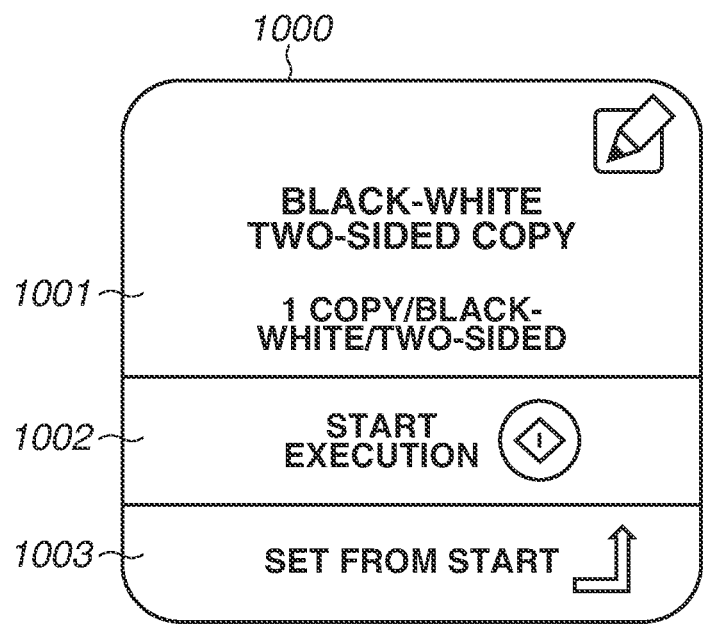
FIG. 10A is an example of a button displayed on a menu screen according to a second exemplary embodiment of the present disclosure.
Figure 10B:
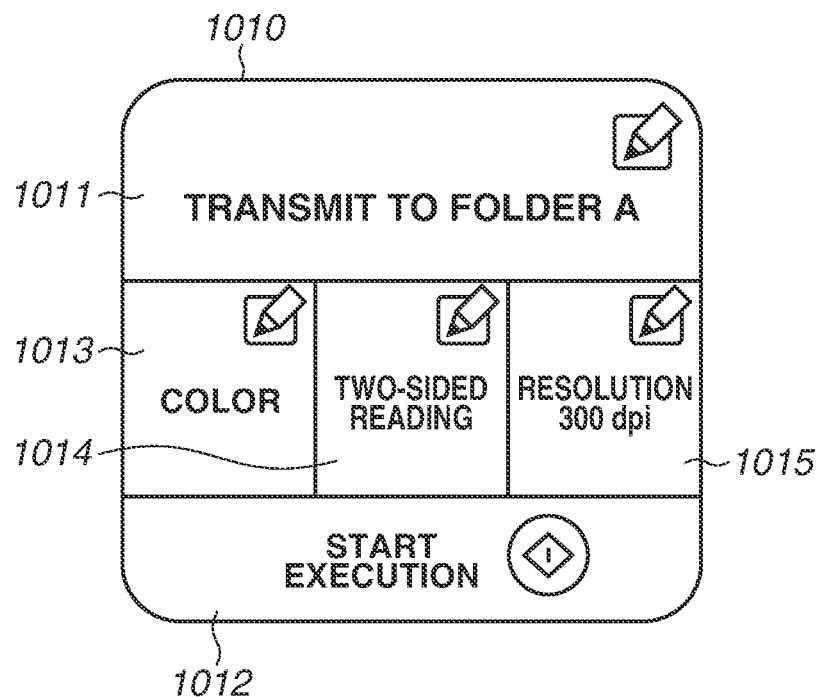
FIG. 10B is another example of the button displayed on the menu screen according to the second exemplary embodiment of the present disclosure.

With reference to FIGS. 10A and 10B, examples of a button displayed on a menu screen according to the second exemplary embodiment are described. FIG. 10A is an example where a button is divided into three areas. A button 1000 is defined in a button management table 402 in FIG. 11. The button 1000 includes three areas, i.e., areas 1001, 1002, and 1003. The area 1001 is an area equivalent to the area 601 in FIG. 6. If the user presses the area 1001, a setting screen for an app is called in the state where a setting value is reflected. The area 1002 is an area equivalent to the area 602 in FIG. 6. If the user presses the area 1002, a job of the app is executed. The area 1003 is an area that does exist in FIG. 6. If the user presses the area 1003, the setting screen for the app is called in the initial state where no setting value is reflected.

FIG. 10B is an example where areas for respective setting value items are provided in addition to the two areas illustrated in the custom button in FIG. 6. A button 1010 is defined in the button management table 402 in FIG. 11. An area 1011 is an area equivalent to the area 601 in FIG. 6. If the user presses the area 1011, a setting screen for an app is called in the state where a setting value is reflected. An area 1012 is an area equivalent to the area 602 in FIG. 6. If the user presses the area 1012, a job of the app is executed. Areas 1013, 1014, and 1015 each independently indicate a setting value defined in a "setting value" column 504. If the user presses any of these areas, a screen for changing only the setting value corresponding to the pressed area is displayed. For example, if the user presses the area 1015, a screen for changing the setting of the resolution is displayed.

FIG. 11 illustrates an example of the button management table 402 according to the second exemplary embodiment. A "display form" column 1101 is added to the button management table 402 described with reference to FIG. 5. The button management table 402 in FIG. 11 defines six buttons in rows 1111 to 1116. The contents of columns 501 to 504, however, are similar to those in FIG. 5, and therefore, only the "display form" column 1101 will be described.

The "display form" column 1101 is a column defining in what shape a button is displayed on the menu screen. In the present exemplary embodiment, three display methods are set as examples. A "Type A" is a method for displaying a button by dividing the button into two areas as in the custom button described in the first exemplary embodiment. A "Type B" is a method for displaying a button by dividing the button into three areas as illustrated in FIG. 10A. A "Type C" is a method for providing areas for respective setting values as illustrated in FIG. 10B. These display methods are merely examples, and other display methods may be prepared.

Figure 12:
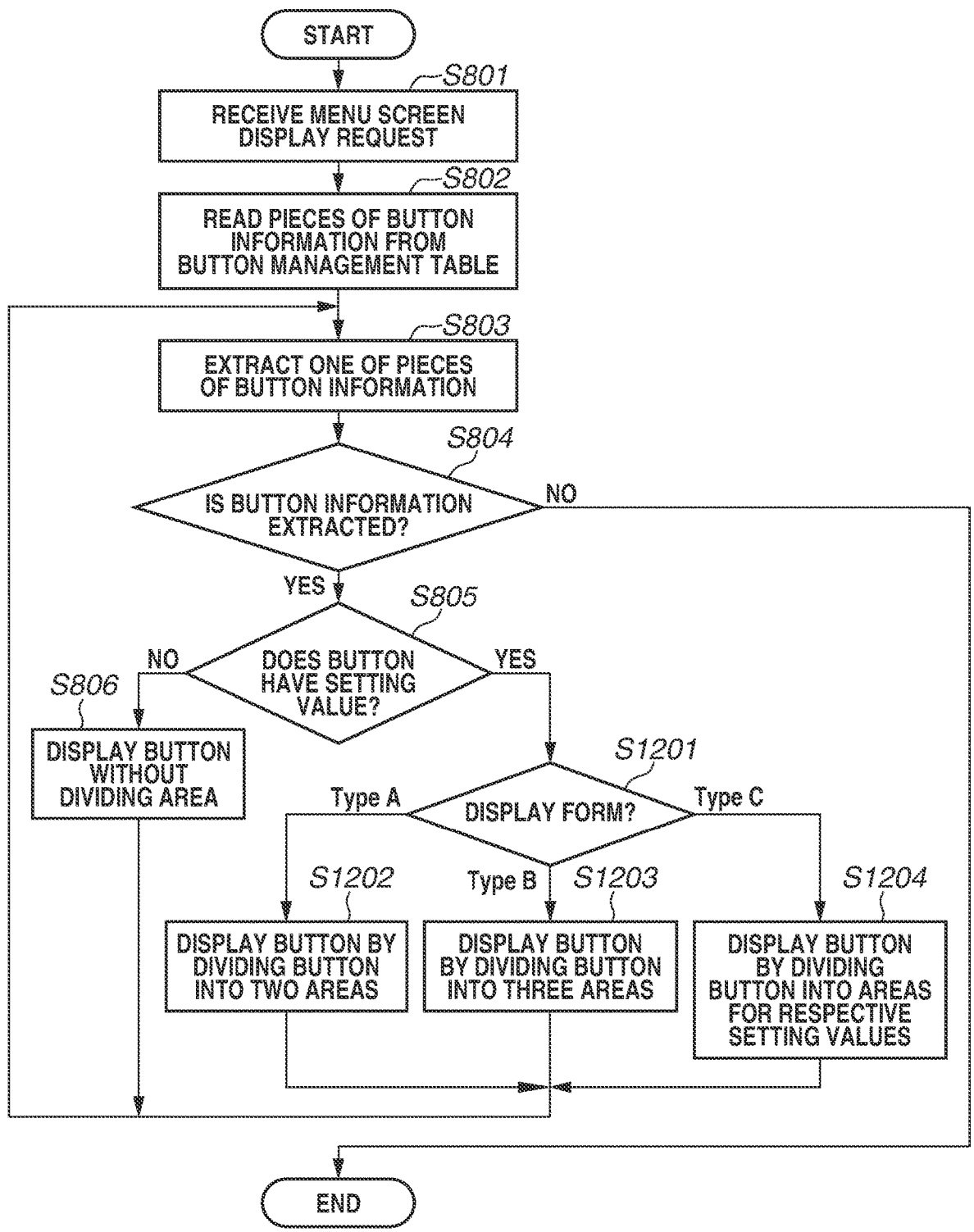
FIG. 12 is a flowchart illustrating processing of an MFP according to the second exemplary embodiment of the present disclosure.

With reference to FIG. 12, a description is given of the process of displaying the menu screen according to the second exemplary embodiment. A flowchart in FIG. 12 is a variation of that in FIG. 8. Only the differences from FIG. 8 are described. FIG. 12 is different from FIG. 8 in that the processes of steps S1201 to S1204 are performed instead of the process of step S807.

In step S1201, with reference to the "display form" column 1101 of the button management table 402, the menu display unit 403 determines the subsequent processing according to the type of the display form. If the "display form" column 1101 indicates the "Type A", the processing proceeds to step S1202. If the "display form" column 1101 indicates the "Type B", the processing proceeds to step S1203. If the "display form" column 1101 indicates the "Type C", the processing proceeds to step S1204.

In step S1202, the menu display unit 403 displays a custom button corresponding to the button information by dividing the custom button into two areas as in the button 511 in FIG. 6. After step S1202, the processing returns to step S803.

In step S1203, the menu display unit 403 displays a custom button corresponding to the button information by dividing the custom button into three areas as illustrated in FIG. 10A. After step S1203, the processing returns to step S803.

In step S1204, the menu display unit 403 displays a custom button corresponding to the button information by dividing the custom button into areas for respective setting values as illustrated in FIG. 10B. After step S1204, the processing returns to step S803.

Figure 13:
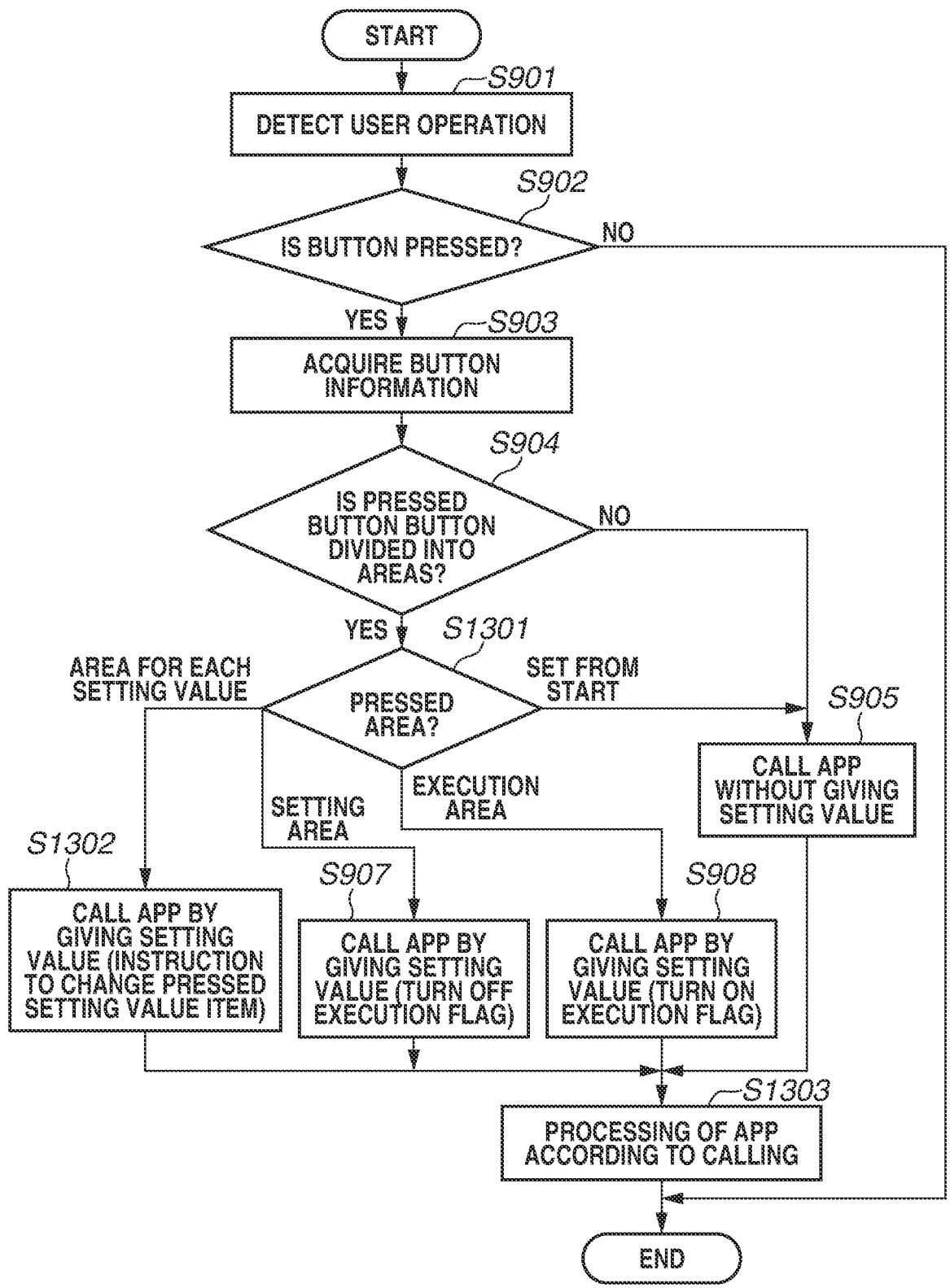
FIG. 13 is a flowchart illustrating processing of the MFP according to the second exemplary embodiment of the present disclosure.

With reference to FIG. 13, a description is given of the process of calling an app from the menu screen according to the second exemplary embodiment. A flowchart in FIG. 13 is a variation of that in FIG. 9. Only the differences from FIG. 9 are described.

Conditional branching is executed in step S1301 instead of step S906. In step S1301, the menu display unit 403 determines which area in the button is pressed by the user in step S901. An example of the determination is described with reference to the button 511 in FIG. 6, the button 1000 in FIG. 10A, and the button 1010 in FIG. 10B. If the area pressed by the user is an "area for each setting value" (i.e., any of the areas 1013, 1014, and 1015), the processing proceeds to step S1302. If the area pressed by the user is a "setting area" (i.e., any of the areas 601, 1001, and 1011), the processing proceeds to step S907. If the area pressed by the user is an "execution area" (i.e., any of the areas 602, 1002, and 1012), the processing proceeds to step S908. If the area pressed by the user is a "set from start" area (i.e., the area 1003), the processing proceeds to step S905.

In step S1302, the menu display unit 403 calls an app corresponding to the pressed button by giving a parameter to the app. The app to be called is an app defined in the "calling target app" column 503 of the button information. The parameter to be given is a setting value defined in the "setting value" column 504 of the button information and an instruction to display a setting screen for changing only a setting item in the area determined in step S1301.

In step S1303, the called app performs processing according to the parameter given to the app when the app is called. In a case where the previous step is step S905, 907, or S908, the processing is similar to that in FIG. 9, and therefore is not described. A case is described where the previous step is step S1302. In a case where the previous step is step S1302, the app displays, for example, a pop-up setting screen that enables the user to change only a notified setting item. The setting screen may display only a setting value to be changed, or may display other setting values in a disabled state so that the other setting values cannot be changed. A job may be executed immediately after the setting is changed, or a confirmation screen may be displayed before the job is executed.

Based on the procedure described above in the present exemplary embodiment, it is possible to assign more various processes to a single button. This improves the convenience for the user.

Third Exemplary Embodiment

In the first and second exemplary embodiments, a description has been given of an exemplary embodiment where a button having a setting value is divided into a plurality of areas. A case is possible where the division of an area in a single button into a plurality of areas narrows each area depending on the design. In this case, the user may press an area different from their intended area. In response, in the present exemplary embodiment, a description is given of an exemplary embodiment having a configuration in which, to prevent the user from pressing the wrong area, if a plurality of areas is present near a pressed position, an inquiry is made again to the user about processing. The third exemplary embodiment is a variation of the second exemplary embodiment, and therefore, only the differences from the second exemplary embodiment are described.

Figure 14:
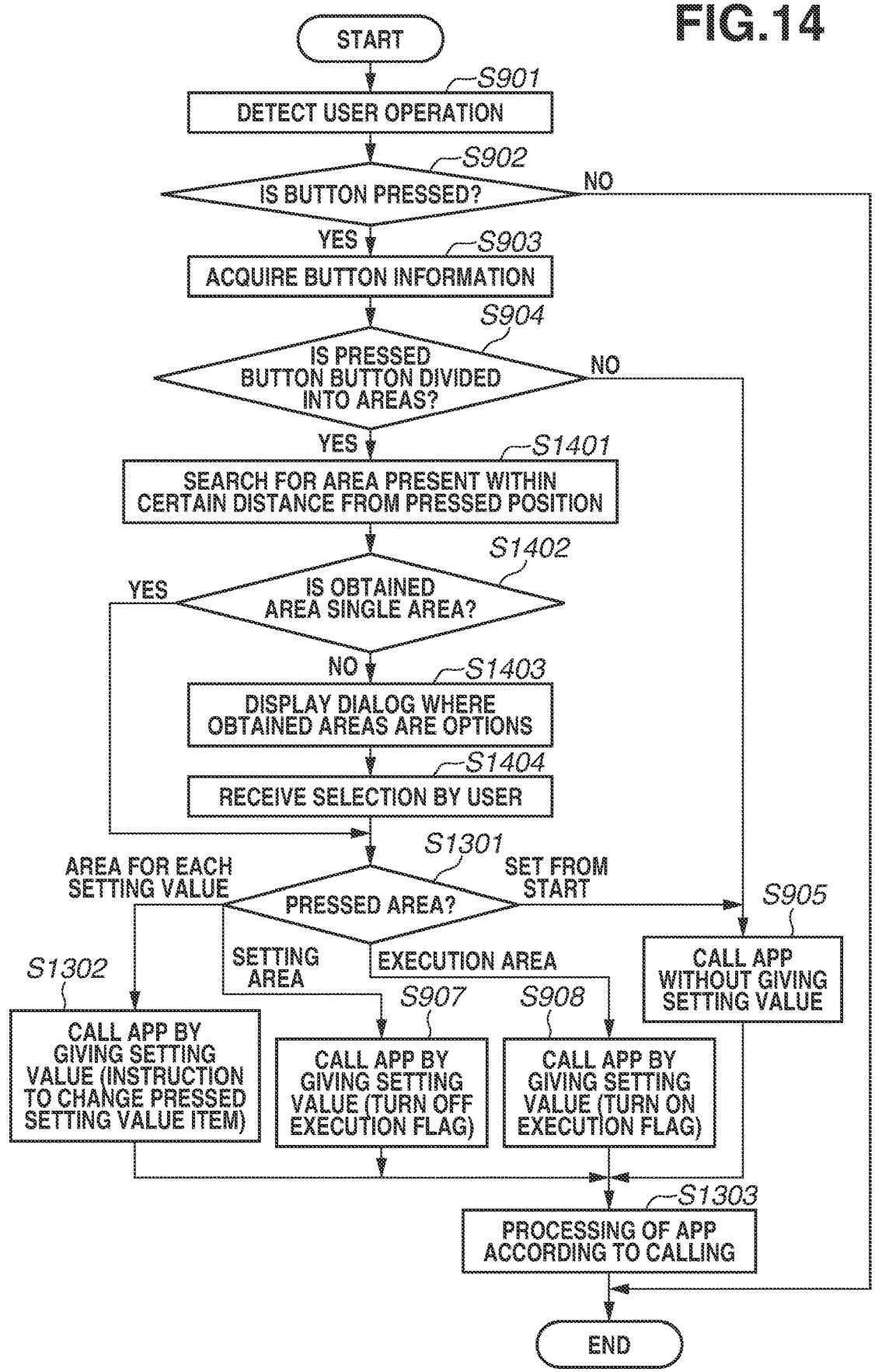
FIG. 14 is a flowchart illustrating processing of an MFP according to a third exemplary embodiment of the present disclosure.

With reference to FIG. 14, a description is given of the process of calling an app from the menu screen according to the third exemplary embodiment. A flowchart in FIG. 14 is a variation of that in FIG. 13, and therefore, only the differences from FIG. 13 are described. FIG. 14 is different from FIG. 13 in that the processes of steps S1401 to S1404 are added between steps S904 and S1301.

In step S1401, the menu display unit 403 searches for an area present within a certain distance from a position pressed by the user in step S901 (i.e., an area that is at least a part of a circle centered at the position pressed by the user and having a radius of a certain distance). For example, if the lower left end of the area 1014 is pressed in FIG. 10B, three areas, i.e., the area 1014 and the areas 1012 and 1013 adjacent to the area 1014, are obtained. As the certain distance used to search for the area, for example, a value nearly equal to the size of a finger of a general user may be used.

In step S1402, the menu display unit 403 determines whether the area obtained in step S1401 is a single area. If the area obtained in step S1401 is a single area (YES in step S1402), the processing proceeds to step S1301. If not (NO in step S1402), the processing proceeds to step S1403.

In step S1403, the menu display unit 403 displays on the operation unit 219 a dialog including the plurality of areas obtained in step S1401 as options, and waits for a selection by the user. For example, if the areas obtained in step S1401 are the areas 1012, 1013, and 1014, "start execution", "color setting", and "two-sided reading setting" are presented as options.

In step S1404, the menu display unit 403 receives an option selected by the user in the dialog and determines the option as an area pressed by the user. Then, the processing proceeds to step S1301. For example, if the user selects "color setting", it is determined in step S1301 that the user presses the area 1013.

Based on the procedure described above in the present exemplary embodiment, in pressing a button in which an area is divided into a plurality of areas, even if the user presses the position where areas contact each other, it is possible to prevent the execution of processing unintended by the user. This improves the convenience for the user.

In the present exemplary embodiment, a configuration is employed in which if the user presses the position where areas contact each other, a dialog is displayed. Alternatively, another method may be used. For example, if there is a plurality of areas obtained in step S1402, the processing may be ended based on the determination that nothing is pressed. The user may press a desired area again.

As another example, a configuration may be employed in which if there is a plurality of areas obtained in step S1402, one of the plurality of areas is selected based on a predetermined rule. For example, if an area for opening a setting screen and an area for giving an execution instruction are present as candidates, priority may be given to the area for opening the setting screen, thereby preventing the execution of processing unintended by the user. If a plurality of setting areas is present as candidates, priority may be given to any of the setting areas that the user changes frequently.

Fourth Exemplary Embodiment

In the first to third exemplary embodiments, a description has been given of an exemplary embodiment where a custom button is divided into a plurality of areas, thereby assigning a plurality of processes to a single button. In the present exemplary embodiment, a description is given of an exemplary embodiment where a plurality of processes is switched according to an operation method such as a two-finger tap, a double tap, or a pinch-out on a single custom button. Further, since people have personal preferences for operation methods, a description is given of an exemplary embodiment having a configuration in which an operation method to be applied can be changed with respect to each user. The fourth exemplary embodiment is a variation of the second exemplary embodiment, and therefore, only the differences from the second exemplary embodiment are described.

Figure 15:
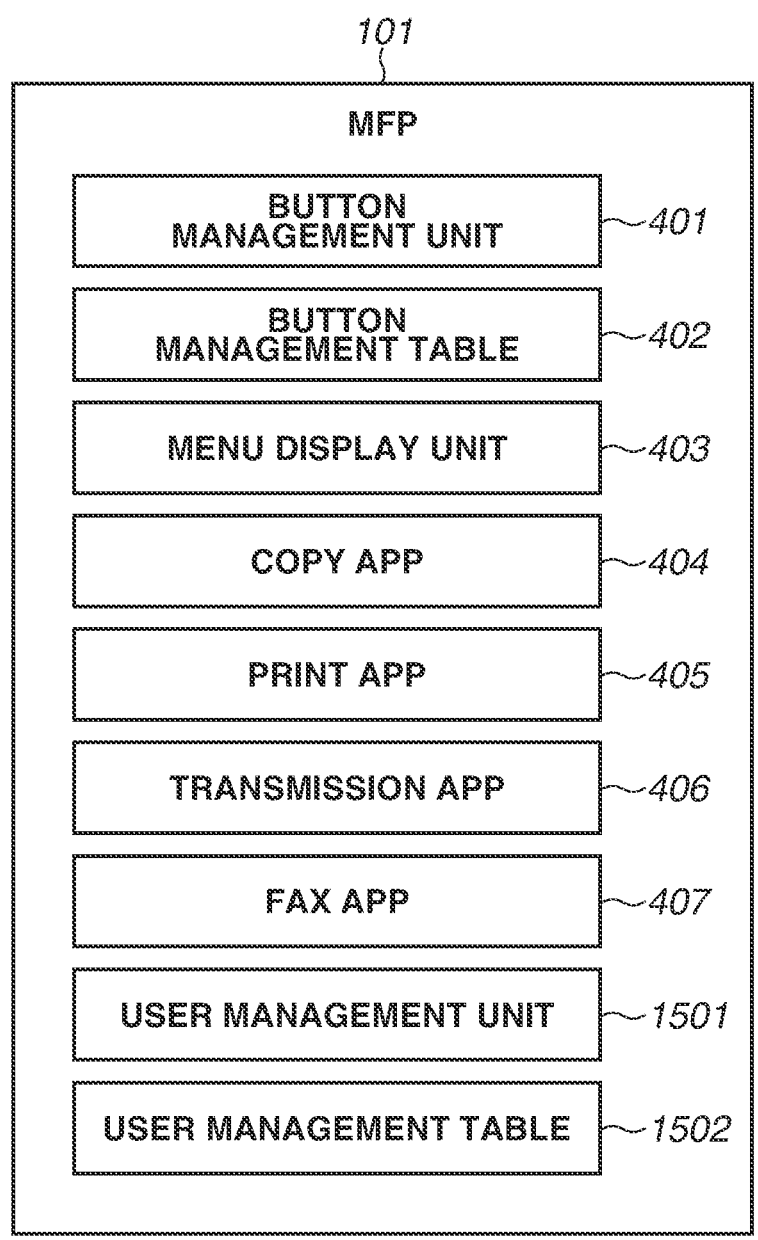
FIG. 15 is a block diagram illustrating a software configuration of an MFP according to a fourth exemplary embodiment of the present disclosure.

FIG. 15 is a software configuration diagram of the MFP 101 according to the present exemplary embodiment. FIG. 15 is a variation of the software configuration diagram in FIG. 4, and therefore, only the differences from FIG. 4 are described. FIG. 15 is different from FIG. 4 in that a user management unit 1501 and a user management table 1502 are added.

The user management unit 1501 manages information regarding a user. The user management unit 1501 authenticates a user who uses the MFP 101, and manages information regarding each user. The user management table 1502 is a table holding information regarding each user and is recorded in the RAM 213 or the HDD 214.

FIG. 16 illustrates an example of the user management table 1502 according to the present exemplary embodiment. The user management table 1502 in FIG. 16 defines six pieces of user information in rows 1611 to 1616 as examples.

The user management table 1502 has three columns, i.e., columns 1601 to 1603. The "user ID" column 1601 is a column defining an identifier for uniquely identifying a user. The "setting calling operation" column 1602 defines an operation method for calling a setting screen on a custom button displayed on the menu screen. The "execution calling operation" column 1603 defines an operation method for giving an execution instruction to the custom button displayed on the menu screen. For example, if a user of the row 1611 wishes to call the setting screen on the custom button, the user may perform a tap operation. If the user wishes to give an execution instruction to the custom button, the user may perform a tap operation with two fingers.

The user management table 1502 defines the assignment of processes according to operation methods, but may define the assignment of processes by dividing a button into areas as described in the first to third exemplary embodiments. For example, the user management table 1502 defines that for a user of the row 1615, different processes are assigned to a button by dividing the button into areas according to the "Type A" (an area is divided into two areas) as described in the second exemplary embodiment.

Figure 17A:
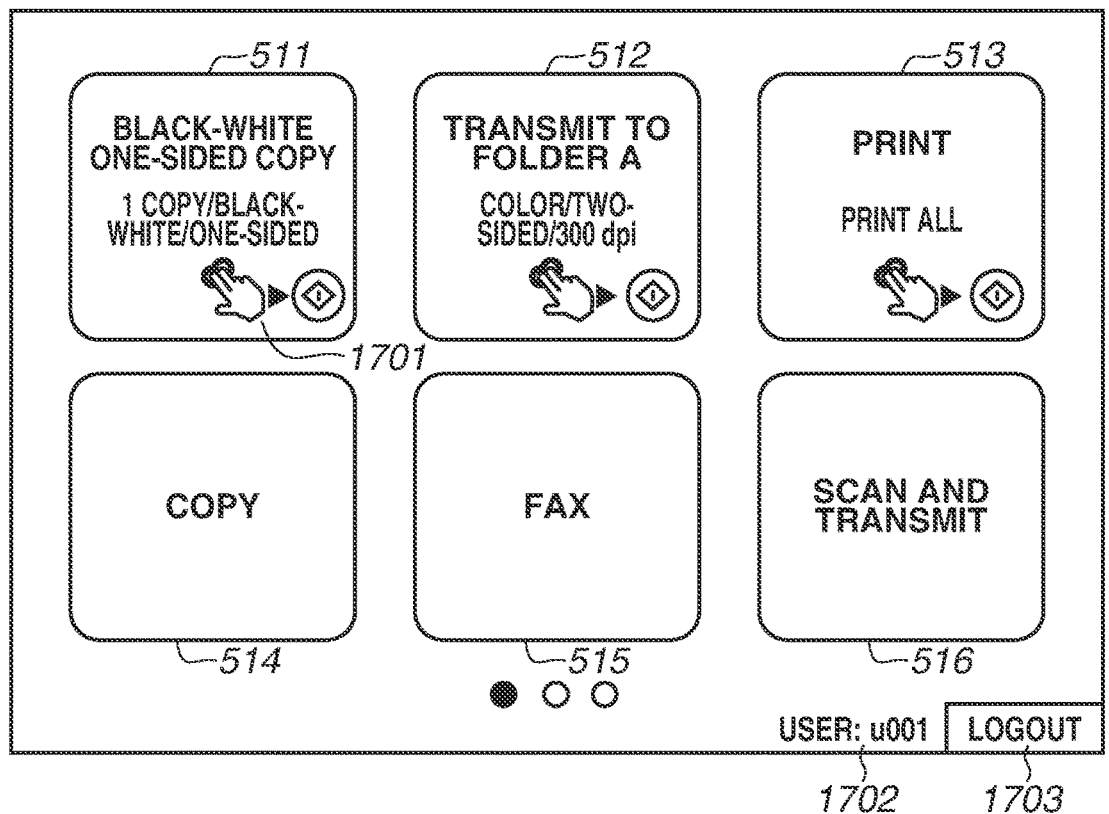
FIG. 17A is an example of a menu screen according to the fourth exemplary embodiment of the present disclosure.
Figure 17B:
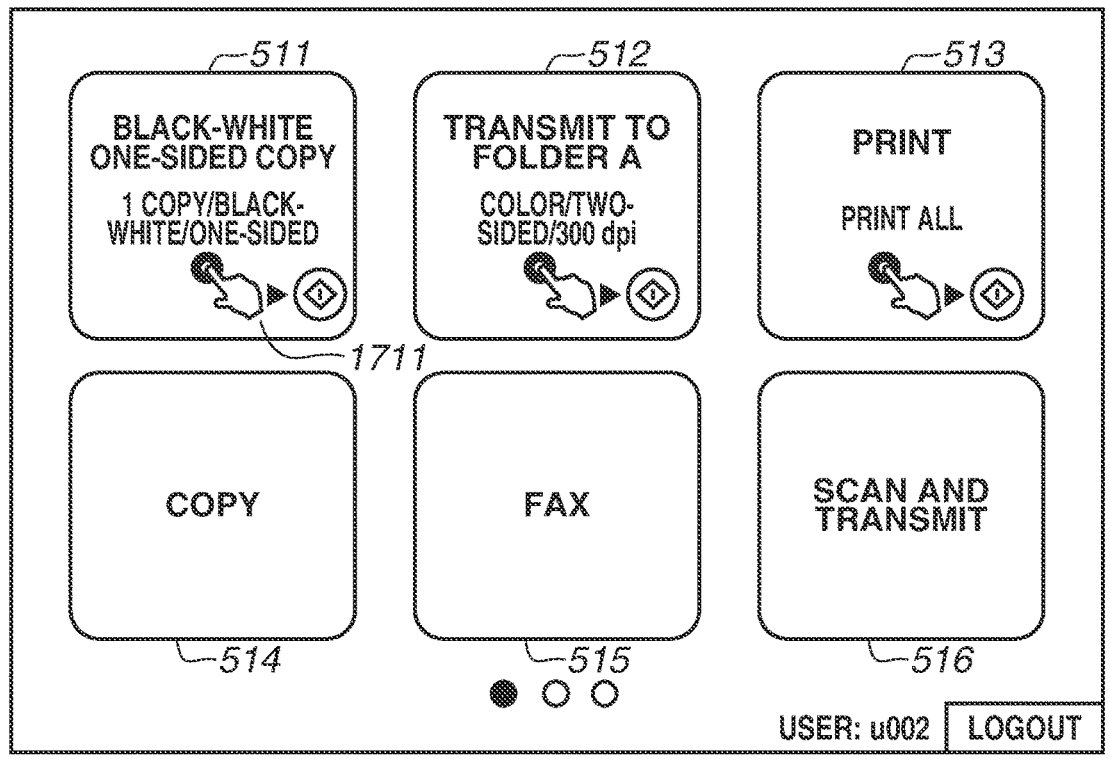
FIG. 17B is another example of the menu screen according to the fourth exemplary embodiment of the present disclosure.

FIGS. 17A and 17B illustrate examples of the menu screen of the MFP 101 according to the present exemplary embodiment. FIG. 17A is an example of the menu screen displayed when the user of the row 1611 of the user management table 1502 has logged in to the MFP 101. An image 1701 is an image indicating that an execution calling operation can be performed by a tap operation with two fingers. A label 1702 indicates the user ID of the logged-in user. A button 1703 is a button for the user to log out.

FIG. 17B is an example of the menu screen displayed when a user of the row 1612 of the user management table 1502 has logged in to the MFP 101. An image 1711 is an image indicating that the execution calling operation can be performed by a long-press operation on a button.

In FIGS. 17A and 17B, only images indicating the execution calling operation are displayed. Alternatively, a configuration may be employed in which an image indicating a setting calling operation is displayed. Alternatively, a configuration may be employed in which an explanation is provided not by an image but by a label.

Figure 18:
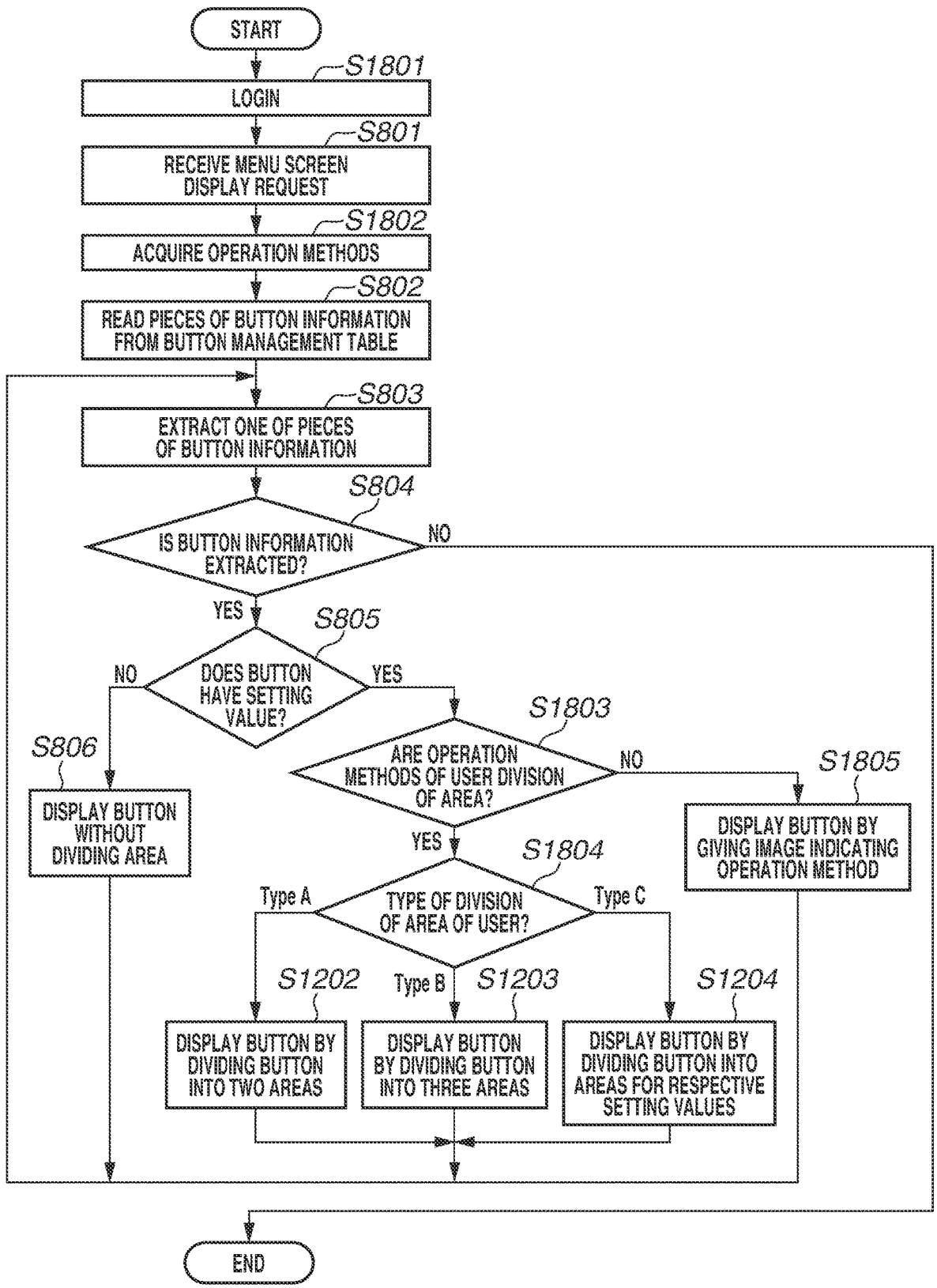
FIG. 18 is a flowchart illustrating processing of an MFP according to the fourth exemplary embodiment of the present disclosure.

With reference to FIG. 18, a description is given of the process of displaying the menu screen according to the fourth exemplary embodiment. A flowchart in FIG. 18 is a variation of that in FIG. 12. Only the differences from FIG. 12 are described. FIG. 18 is different from FIG. 12 in that a user is identified by a login operation of the user before an operation (steps S1801 and S1802), and the display of buttons is changed according to operation methods of the user defined in the user management table 1502 (steps S1803 to S1805).

In step S1801, the user management unit 1501 authenticates a user by a login operation of the user. In the following description, the user having logged in in step S1801 will be referred to as the "logged-in user". In step S1802, the menu display unit 403 acquires, from the user management table 1502, operation methods (the "setting calling operation" column 1602 and the "execution calling operation" column 1603) on the menu screen for the logged-in user.

In step S1803, the menu display unit 403 determines whether, on the menu screen for the logged-in user acquired in the previous step, the assignment of the setting calling process and the execution calling process is defined as "the division of an area" in a button. If the assignment of the processes is defined as "the division of an area" (YES in step S1803), the processing proceeds to step S1804. If not (NO in step S1803), the processing proceeds to step S1805.

In step S1804, the menu display unit 403 determines the subsequent processing depending on the type of the division of an area defined in the "setting calling operation" column 1602 and the "execution calling operation" column 1603 of the logged-in user. If the type of the division of an area is the "Type A", the processing proceeds to step S1202. If the type of the division of an area is the "Type B", the processing proceeds to step S1203. If the type of the division of an area is the "Type C", the processing proceeds to step S1204.

In step S1805, the menu display unit 403 displays a custom button corresponding to the button information. At this time, as illustrated in the image 1701 in FIG. 17A and the image 1711 in FIG. 17B, an image indicating the operation method is given to the button.

Figure 19:
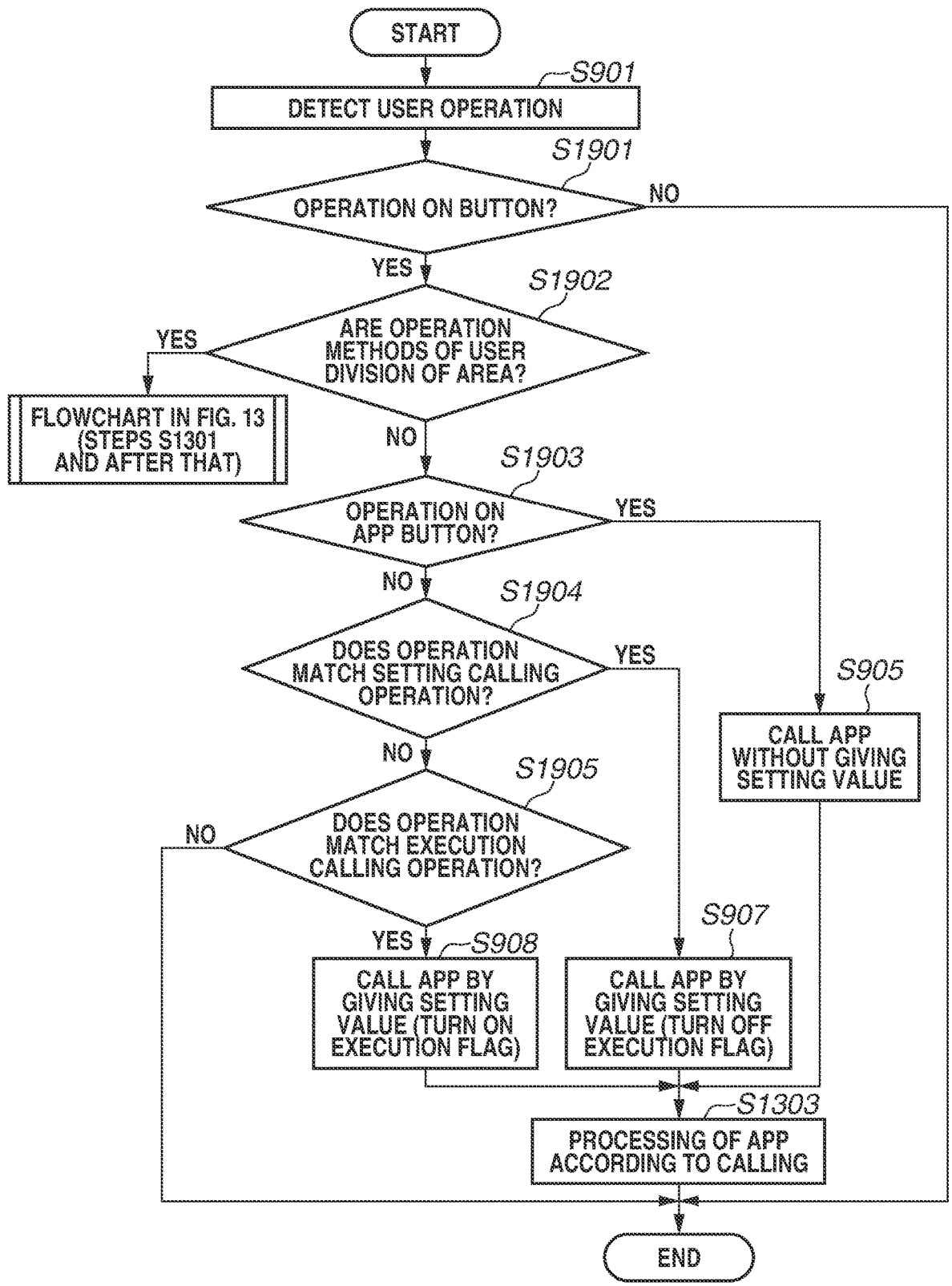
FIG. 19 is a flowchart illustrating processing of the MFP according to the fourth exemplary embodiment of the present disclosure.

With reference to FIG. 19, a description is given of the process of calling an app from the menu screen according to the fourth exemplary embodiment. A flowchart in FIG. 19 is a variation of that in FIG. 13, and therefore, only the differences from FIG. 13 are described. Also in the present exemplary embodiment, processes similar to the processes of step S1301 and the subsequent steps in FIG. 13 are performed, and therefore are not illustrated in FIG. 19.

In step S1901, based on whether the user operation detected in the previous step is an operation on an area where a button is drawn, the menu display unit 403 determines whether the user operation is an operation on a button. If it is determined that the user operation is an operation on a button (YES in step S1901), the processing proceeds to step S1902. If not (NO in step S1901), the processing is ended. In the following description, the button operated by the user in step S901 will be referred to as the "operated button".

In step S1902, the menu display unit 403 determines whether operation methods (the "setting calling operation" column 1602 and the "execution calling operation" column 1603 of the user management table 1502) on the menu screen for the logged-in user are defined as "the division of an area". If the operation methods on the menu screen for the logged-in user are defined as "the division of an area" (YES in step S1902), the processing proceeds to step S1301 in the flowchart in FIG. 13. If not (NO in step S1902), the processing proceeds to step S1903.

In step S1903, the menu display unit 403 determines whether the operated button is an app button. If the operated button is an app button (YES in step S1903), the processing proceeds to step S905. If not (NO in step S1903), the processing proceeds to step S1904.

In step S1904, the menu display unit 403 determines whether the operation performed by the user in step S901 matches the operation defined in the "setting calling operation" column 1602. If the operations match each other (YES in step S1904), the processing proceeds to step S907. If not (NO in step S1904), the processing proceeds to step S1905.

In step S1905, the menu display unit 403 determines whether the operation performed by the user in step S901 matches the operation defined in the "execution calling operation" column 1603. If the operations match each other (YES in step S1905), the processing proceeds to step S908. If not (NO in step S1905), the processing is ended.

Based on the procedure described above in the present exemplary embodiment, it is possible to perform a plurality of processes by operation methods performed on a single custom button by a user. This improves the convenience for the user. The present exemplary embodiment has illustrated a configuration in which a user logs in, and a setting calling operation and an execution calling operation are defined with respect to each user. The present disclosure, however, is not limited to this. Alternatively, the default settings of the setting calling operation and the execution calling operation may be held in advance and then applied to a user who has not logged in.

OTHER EMBODIMENTS

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like) and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-171678, filed Sep. 20, 2019, and Japanese Patent Application No. 2020-104632, filed Jun. 17, 2020, which are hereby incorporated by reference herein in their entirety.

What is claimed is:

1. A device having an image processing function, the device comprising:
  a memory; and
  a processor in communication with the memory, wherein the processor is configured to perform:
    displaying a first object and a second object which are associated with the image processing function;
    detecting an operation of a user;
    based on the detected operation that is an operation on the first object, executing the processing with setting parameters; and
    based on the detected operation that is an operation on the second object, displaying a setting screen to set the setting parameters,
    wherein the displaying includes displaying the first object and the second object adjacent to each other, and wherein in the first object, an image indicating execution of the processing is displayed.

2. The device according to claim 1,
wherein the first object and the second object are further associated with a setting value, and
wherein the processor is further configured to perform:
based on the detected operation that is an operation on the first object, executing the processing by reflecting the setting value; and
based on the detected operation that is an operation on the second object, displaying the setting screen for the processing in a state where the setting value is reflected.

3. The device according to claim 2, wherein in the second object, information indicating the setting value associated with the second object is displayed.

4. The device according to claim 2,
wherein the first object and the second object are displayed as a single display object,
wherein the displayed display object is displayed in a state where an area of the display object is divided into a plurality of areas for setting values associated with the display object.

5. The device according to claim 4, wherein in a case where the detected operation is an operation on one of the areas divided for respective items of the setting values, a screen for changing the setting value corresponding to the area where the detected operation is performed is opened.

6. The device according to claim 4, wherein the processor is further configured to perform, in a case where the display object displayed in a state where the area of the display object is divided into the plurality of areas is operated, and an area other than an area where the operation is performed is included near an operated position, performing a predetermined process.

7. The device according to claim 1, wherein the setting screen for the processing is a setting screen in an initial state.

8. The device according to claim 1, wherein in the second object, an image indicating opening of the setting screen is displayed.

9. The device according to claim 1, wherein
the first object and the second object are displayed to configure first and second areas formed by dividing a single button.

10. The device according to claim 1, wherein
the first object and the second object have a same width, and are displayed lengthwise.

11. The device according to claim 1, wherein
the first object and the second object are displayed in a menu screen used for selecting a function to be executed.

12. The device according to claim 1, wherein
the first object and the second object are displayed as a single display object,
the display object is displayed with a size same as function buttons for executing functions included in a menu screen.

13. The device according to claim 1, wherein
the first object and the second object are displayed as a single display object,
the displaying includes:
displaying a plurality of display objects on a screen; and
displaying a common icon that is used for the respective first objects of the plurality of the display objects.

14. The device according to claim 1, wherein
the first object and the second object are displayed as a single display object,
the displaying includes:
displaying a plurality of display objects on a screen; and
displaying a common icon that is used for the respective second objects of the plurality of the display objects.

15. The device according to claim 1, wherein
the device is an image forming apparatus, and
the processing includes at least one of copy, print, and image transmission processes.

16. The device according to claim 1, wherein the processor is further configured to perform:
based on the detected operation that is an operation on the second object, changing a screen from a screen including the first object and the second object to the setting screen.

17. A method for a device having an image processing function, the method comprising:
displaying a first object and a second object which are associated with the image processing function;
detecting an operation of a user;
based on the detected operation that is an operation on the first object, executing the processing with setting parameters; and
based on the detected operation that is an operation on the second object, displaying a setting screen to set the setting parameters,
wherein the displaying includes displaying the first object and the second object adjacent to each other, and
wherein in the first object, an image indicating execution of the processing is displayed.

18. A non-transitory computer-readable storage medium storing a program including instructions, which when executed by one or more processors of a device having an image processing function, cause the device to perform operations comprising:
displaying a first object and a second object which are associated with the image processing function;
detecting an operation of a user;
based on the detected operation that is an operation on the first object, executing the processing with setting parameters; and
based on the detected operation that is an operation on the second object, displaying a setting screen to set the setting parameters,
wherein the displaying includes displaying the first object and the second object adjacent to each other, and
wherein in the first object, an image indicating execution of the processing is displayed.

* * * * *